(12) United States Patent
Miyazaki et al.

(10) Patent No.: US 11,696,019 B2
(45) Date of Patent: Jul. 4, 2023

(54) ACCESSORY AND ELECTRONIC APPARATUS

(71) Applicant: CANON KABUSHIKI KAISHA, Tokyo (JP)

(72) Inventors: Sho Miyazaki, Kanagawa (JP); Kei Tohyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/721,510

(22) Filed: Apr. 15, 2022

(65) Prior Publication Data

US 2022/0345639 A1 Oct. 27, 2022

(30) Foreign Application Priority Data

Apr. 23, 2021 (JP) ................................ 2021-072950

(51) Int. Cl.
*H04N 5/232* (2006.01)
*H04N 23/63* (2023.01)
*H04N 23/53* (2023.01)
*H04N 23/661* (2023.01)

(52) U.S. Cl.
CPC ......... *H04N 23/633* (2023.01); *H04N 23/531* (2023.01); *H04N 23/661* (2023.01)

(58) Field of Classification Search
CPC ............. H04N 5/232; H04N 5/232939; H04N 5/225251; H04N 5/23206; H04N 23/633; H04N 23/531; H04N 23/661; H04N 23/60; H04N 23/651; H04N 23/56; G03B 17/18; G03B 7/00; G03B 15/03; G03B 15/05
See application file for complete search history.

(56) References Cited

U.S. PATENT DOCUMENTS 10,097,768 B2 * 10/2018 Ichihara ............. H04N 5/23245

FOREIGN PATENT DOCUMENTS

JP 2016-061800 A 4/2016
JP 2016061800 A * 4/2016

* cited by examiner

*Primary Examiner* — Yogesh K Aggarwal
(74) *Attorney, Agent, or Firm* — Cowan, Liebowitz & Latman, P.C.

(57) ABSTRACT

An accessory is detachably attachable to an electronic apparatus including a display. The accessory includes a communication unit configured to communicate with the electronic apparatus and an operation unit. If an operation is performed on the operation unit after the communication unit transmits information indicating a type of the accessory to the electronic apparatus, the communication unit transmits, to the electronic apparatus, a request for causing the display to display a setting image related to the accessory.

16 Claims, 27 Drawing Sheets

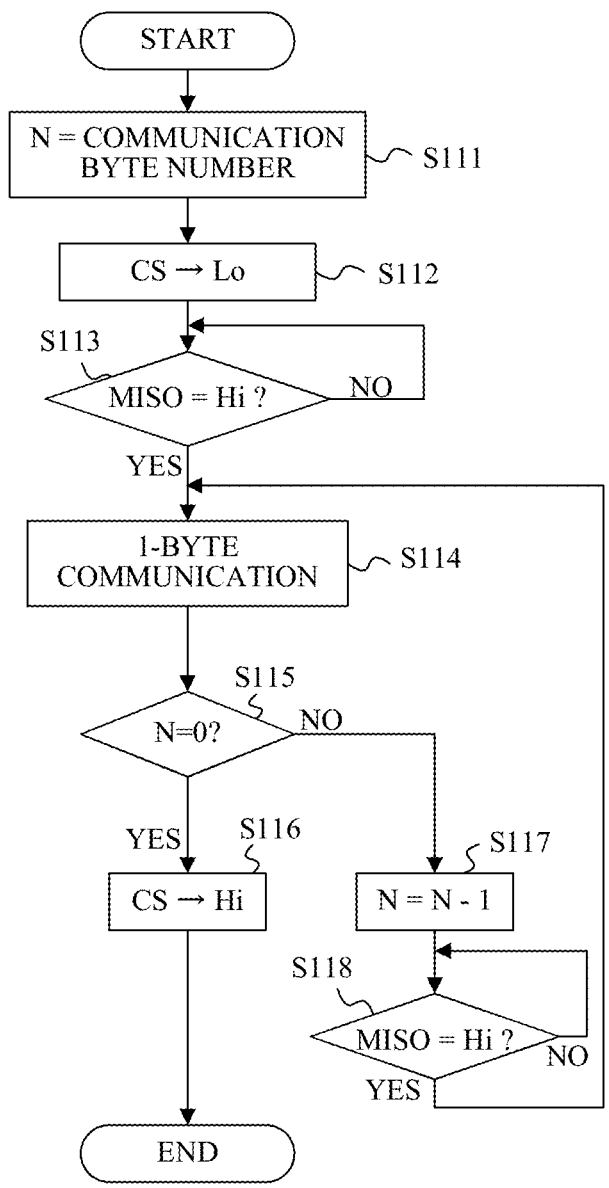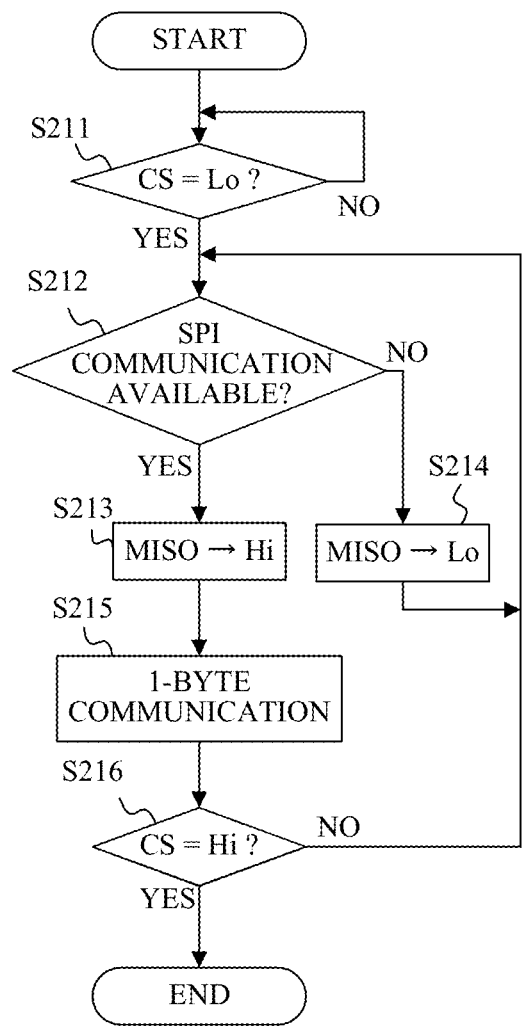
FIG. 4A                    FIG. 4B

|  | 1ST BYTE | 2ND BYTE | 3RD BYTE | ... | (N-2)TH BYTE | (N-1)TH BYTE | NTH BYTE |
|---|---|---|---|---|---|---|---|
| MOSI DATA | CMD | MOSI_DATA1 | MOSI_DATA2 | ... | MOSI_DATA[N-3] | CheckSum_C | 0x00 |
| MISO DATA | 0xA5 | CMD | MISO_DATA1 | ... | MISO_DATA[N-4] | 0x00 | CheckSum_A |

FIG. 5

| ADDRESS | D7 | D6 | D5 | D4 | D3 | D2 | D1 | D0 |
|---|---|---|---|---|---|---|---|---|
| 0x00 | ACC TYPE | | | | | | | |
| 0x01 | ACC ID NO. | | | | | | | |
| 0x02 | FIRMWARE VER. | | | | | | | |
| 0x03 | POWER SUPPLY DURING POWER-OFF | | POWER SUPPLY DURING AUTOMATIC POWER-OFF | | POWER SUPPLY SPECIFICATION | | CHARGEABILITY | |
| 0x04 | REQUEST CURRENT | | | | | | | |
| 0x05 | FIRMWARE UPDATE MODE | FIRMWARE UPDATE FUNCTION | INTERMEDIATE ACCESSORY OPERATION PERMISSION | INTERMEDIATE ACCESSORY CONFIRMATION AT START | | | I2C COMMAND COMMUNICATION AVAILABILITY | |
| 0x06 | RESERVE | | COMMUNICATION METHOD FOR COMMUNICATION REQUEST FACTOR | | FUNCTIONAL SIGNAL 4 | FUNCTIONAL SIGNAL 3 | FUNCTIONAL SIGNAL 2 | FUNCTIONAL SIGNAL 1 |
| 0x07 | RESERVE | | | | | | | |
| 0x08 | RESERVE | | | | | | | |
| 0x09 | RESERVE | | | | | | | |
| 0x0A | SILENT START | GENERATING FACTOR OF COMMUNICATION REQUEST SIGNAL | | | | | | |
| 0x0B | RESERVE | | | | | | | |
| 0x0C | RESERVE | | | | | | SPI PROTOCOL | CS CONTROL LOGIC |
| 0x0D | COMMUNICATION INTERVAL BETWEEN BYTES | | | | | | | |
| 0x0E | COMMUNICATION INTERVAL BETWEEN BYTES (IN FIRMWARE UPDATE MODE) | | | | | | | |
| 0x0F | CHECKSUM | | | | | | | |

FIG. 7

| NO. | TYPE |
|---|---|
| 0x00 | RESERVE |
| 0x01 | RESERVE |
| : | : |
| 0x80 | STROBE TRANSMITTER |
| 0x81 | STROBE |
| 0x82 | INTERFACE CONVERSION ADAPTER |
| 0x83 | MICROPHONE |
| 0x84 | MULTI-ACCESSORY CONNECTION ADAPTER |
| 0x85 | RESERVE |
| 0x86 | RESERVE |
| 0x87 | RESERVE |
| 0x88 | RESERVE |
| 0x89 | RESERVE |
| 0x90 | RESERVE |
| : | : |
| 0xFF | RESERVE |

FIG. 8

| FACTOR NO. | FACTOR CONTENT |
|---|---|
| 0x00 | MENU INVOCATION UNIT OPERATION |
| 0x01 | COMPLETION OF OUTPUT CONTROL OF AUDIO SIGNAL |
| 0x02 | COMPLETION OF MUTE PROCESSING OF AUDIO SIGNAL |
| 0x03 | |
| 0x04 | |
| 0x05 | |
| 0x06 | |
| 0x07 | |
| : | |
| 0x79 | |
| 0x7A | |
| 0x7B | |
| 0x7C | |
| 0x7D | |
| 0x7E | |
| 0x7F | |

FIG. 9

| | COMMUNICATION INTERVAL |
|---|---|
| 0 | 1us |
| 1 | 2us |
| 2 | 5us |
| 3 | 10us |
| 4 | 15us |
| 5 | 25us |
| 6 | 50us |
| 7 | 100us |

FIG. 10A

| | COMMUNICATION INTERVAL |
|---|---|
| 0 | 1ms |
| 1 | 2ms |
| 2 | 5ms |
| 3 | 10ms |
| 4 | 20ms |
| 5 | 50ms |
| 6 | 80ms |
| 7 | 100ms |

FIG. 10B

| ADDRESS | D7 | D6 | D5 | D4 | D3 | D2 | D1 | D0 |
|---|---|---|---|---|---|---|---|---|
| 0x00 | FEB | | SYNC | | WIRELESS | | | MODE |
| 0x01 | LIGHT EMISSION AMOUNT | | | | | | | |
| 0x02 | CH | | | | LIGHT EMISSION | LIGHT CONTROL AMOUNT | | |
| 0x03 | GrA MODE | | RESERVE | | Gr | | RATIO | |
| 0x04 | GrE MODE | | GrD MODE | | GrC MODE | | GrB MODE | |
| 0x05 | GrA LIGHT EMISSION AMOUNT/LIGHT CONTROL AMOUNT | | | | | | | |
| 0x06 | GrB LIGHT EMISSION AMOUNT/LIGHT CONTROL AMOUNT | | | | | | | |
| 0x07 | GrC LIGHT EMISSION AMOUNT/LIGHT CONTROL AMOUNT | | | | | | | |
| 0x08 | GrD LIGHT EMISSION AMOUNT/LIGHT CONTROL AMOUNT | | | | | | | |
| 0x09 | GrE LIGHT EMISSION AMOUNT/LIGHT CONTROL AMOUNT | | | | | | | |
| 0x0A | ID (1) | | | | | | | |
| 0x0B | ID (2) | | | | | | | |
| 0x0C | NUMBER OF LIGHT EMISSIONS | | | | | | | |
| 0x0D | STROBE CUSTOM SETTINGS 0~7 | | | | | | | |
| 0x0E | SECOND LAYER | | FIRST LAYER | | FOURTH LAYER | | LAYER | SEQUENCE |
| 0x0F | RESERVE | | | | | | THIRD LAYER | SECOND LAYER |

FIG. 14A

| FIRST LAYER INFORMATION | |
|---|---|
| SETTING | ITEM |
| 0 | MODE |
| 1 | WIRELESS |
| 2 | ZOOM |
| 3 | SYNC |
| 4 | LIGHT EMISSION AMOUNT/ LIGHT CONTROL AMOUNT |
| 5 | FEB |
| 6 | CH |
| 7 | ID |
| 8 | RATIO |
| 9 | Gr |
| 10 | RESERVE |
| 11 | RESERVE |
| 12 | RESERVE |
| 13 | RESERVE |
| 14 | RESERVE |
| 15 | RESERVE |

FIG. 14D

| HIERARCHY INFORMATION | |
|---|---|
| SETTING | LAYER |
| 0 | FIRST LAYER |
| 1 | SECOND LAYER |
| 2 | THIRD LAYER |
| 3 | FOURTH LAYER |
| 4 | RESERVE |
| 5 | RESERVE |
| 6 | RESERVE |
| 7 | RESERVE |

FIG. 14C

| SEQUENCE INFORMATION | |
|---|---|
| SETTING | SEQUENCE |
| 0 | STROBE SETTING SCREEN |
| 1 | STROBE CUSTOM SETTING SCREEN |

FIG. 14B

| FIRST LAYER | | SECOND LAYER | |
|---|---|---|---|
| NO | CONTENT | SETTING | MEANING |
| 0 | DISTANCE DISPLAY | 0 | METERS |
| | | 1 | FEET |
| 1 | AUTO-POWER OFF | 0 | ON |
| | | 1 | OFF |
| 2 | MODELING LIGHT EMISSION | 0 | ON |
| | | 1 | OFF |
| 3 | FEB IMAGE PICKUP AUTO-CANCELING | 0 | ON |
| | | 1 | OFF |
| 4 | FEB IMAGE PICKUP ORDER | 0 | 0→-→+ |
| | | 1 | -→0→+ |
| 5 | AF AUXILIARY LIGHT EMISSION | 0 | ON |
| | | 1 | OFF |
| 6 | AUTO-POWER OFF TIME OF RECEIVER | 0 | 60 MINUTES |
| | | 1 | 10 MINUTES |
| 7 | SETTING METHOD OF LIGHT CONTROL CORRECTION | 0 | BUTTON + DIAL |
| | | 1 | DIAL |

FIG. 17

ACCESSORY AND ELECTRONIC APPARATUS

BACKGROUND OF THE INVENTION

Field of the Invention

The present invention relates to an accessory detachably attachable to an electronic apparatus.

Description of the Related Art

A method has been known that uses a display provided on an image pickup apparatus and changes a setting of an accessory attached to the image pickup apparatus. Japanese Patent Laid-Open No. ("JP") 2016-61800 discloses an image pickup apparatus including a display controller that controls a display of a setting screen used for setting an adjustment value related to a function using an accessory.

However, when using the image pickup apparatus of JP 2016-61800, a user has to search for the setting screen for each accessory, and it takes time and effort to change the setting after the accessory is attached.

SUMMARY OF THE INVENTION

The present invention provides an accessory with which it is easy to cause an accessory setting image to be displayed on a display provided on an electronic apparatus.

An accessory according to one aspect of embodiments of the disclosure is detachably attachable to an electronic apparatus including a display. The accessory includes a communication unit configured to communicate with the electronic apparatus and an operation unit. If an operation is performed on the operation unit after the communication unit transmits information indicating a type of the accessory to the electronic apparatus, the communication unit transmits, to the electronic apparatus, a request for causing the display to display a setting image related to the accessory An electronic apparatus according to one aspect of embodiments of the disclosure is an electronic apparatus to which an accessory is detachably attachable. The electronic apparatus includes a communication unit capable of communicating with the accessory and a display configured to display a setting image related to the accessory. If the communication unit receives a request for causing the display to display the setting image after receiving information indicating a type of the accessory, the display displays the setting image.

Further features of the present invention will become apparent from the following description of exemplary embodiments with reference to the attached drawings.

BRIEF DESCRIPTION OF THE DRAWINGS

FIGS. 4A and 4B are diagrams illustrating operation flows in an SPI protocol B to be executed by the second camera control circuit and the accessory control circuit.

FIG. 5 is a diagram illustrating an example of contents of SPI communication.

FIG. 7 is a diagram illustrating an example of accessory information.

FIG. 8 is a diagram illustrating an example of accessory type information.

FIG. 9 is a diagram illustrating examples of generating factors of a communication request signal.

FIGS. 10A and 10B are diagrams illustrating examples of information indicating communication intervals.

FIGS. 14A to 14D are diagrams illustrating examples of setting information on a strobe transmitter.

FIG. 17 is a diagram illustrating an example of a hierarchy structure of the custom setting screens of the strobe transmitter according to the second embodiment.

DESCRIPTION OF THE EMBODIMENTS

Figure 1:
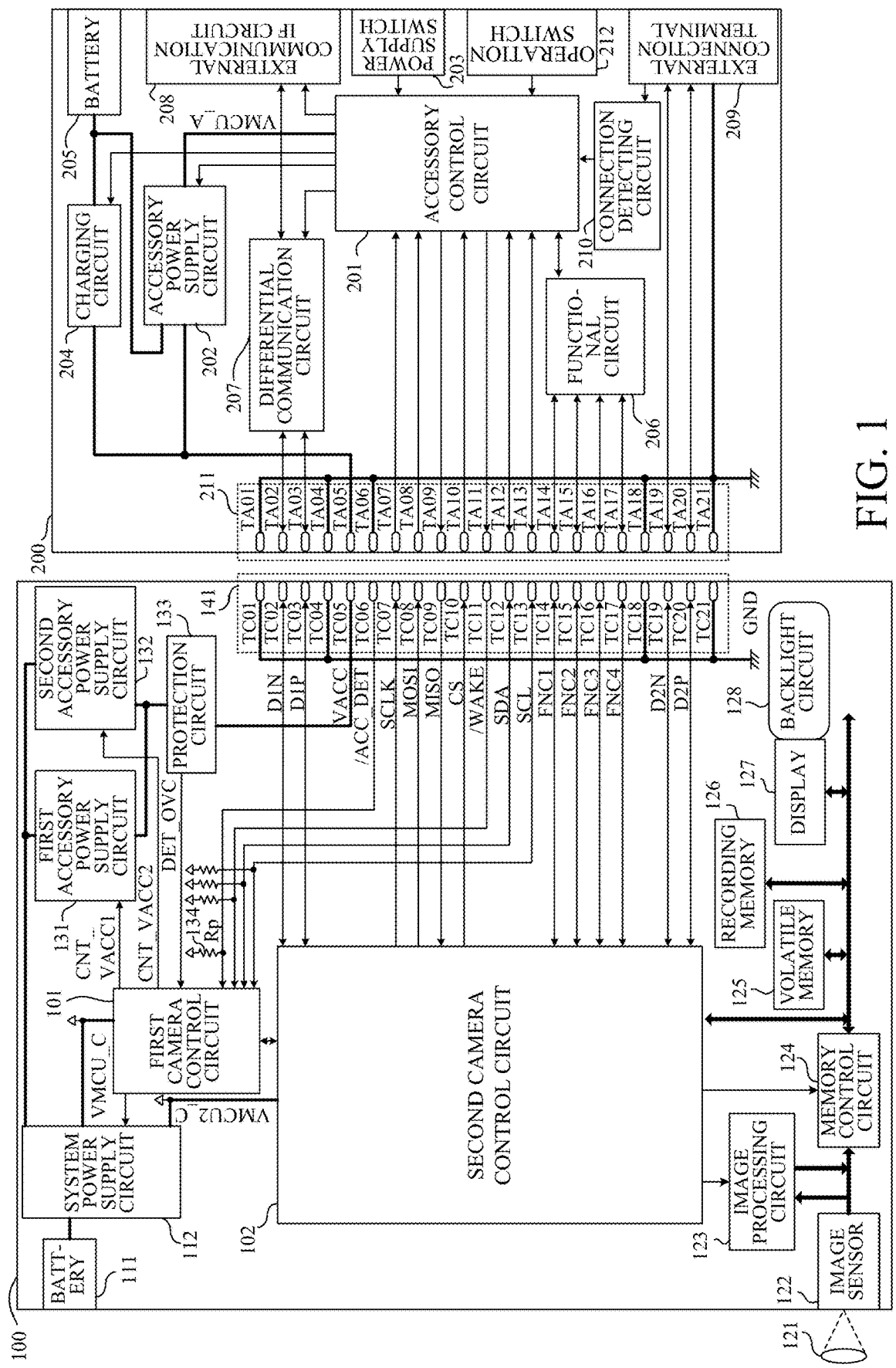
FIG. 1 is a block diagram illustrating a camera system according to embodiments of the present invention.

Referring now to the accompanying drawings, a description will be given of embodiments according to the present invention. Corresponding elements in respective figures will be designated by the same reference numerals, and a duplicate description will be omitted.

FIG. 1 illustrates is a block diagram illustrating a camera system (display system) according to embodiments of the present invention. The camera system includes a camera (electronic apparatus) 100 and an accessory 200 detachably attachable to the camera 100. A plurality of contacts (terminals) TC01 to TC21 of a camera connection unit 141 provided in the camera 100 contact a plurality of contacts TA01 to TA21 of an accessory connection unit (communication unit) 211 provided in the accessory 200, respectively. Thereby, the camera 100 and the accessory 200 are electrically connected. The accessory 200 may not have part of the plurality of contacts TA01 to TA21.

The camera 100 is supplied with power from a battery 111 that is attachable to and detachable from the camera 100.

A first camera control circuit 101 and a second camera control circuit 102 are microcomputers including built-in CPUs or the like and control the entire camera 100. The first camera control circuit 101 monitors unillustrated switches and the like for a camera operation. The first camera control circuit 101 operates even when the camera 100 is in a standby state (low power consumption mode) and performs control on a system power supply and the like according to an operation by a user. The second camera control circuit 102 performs control on an image sensor 122, a display 127, and the like and stops operating when the camera 100 is in the standby state.

A system power supply circuit 112 includes a DCDC converter circuit, Low Dropout (LDO), a charge pump circuit, and the like and generates a power supply to be supplied to each circuit in the camera 100. Camera microcomputer power supply VMCU_C having a voltage of 1.8 V that is generated by the system power supply circuit 112 is constantly supplied to the first camera control circuit 101. Voltages of several types of power supplies that are generated by the system power supply circuit 112 are supplied as camera microcomputer power supply VMCU2_C to the second camera control circuit 102 at an arbitrary timing. The first camera control circuit 101 controls turning on and off of the power supply to each circuit in the camera 100 by controlling the system power supply circuit 112.

An optical lens 121 is configured so as to be attachable to and detachable from the camera 100. Light from an object incident through the optical lens 121 is imaged on the image sensor 122 including a CMOS sensor, a CCD sensor, or the like. The optical lens 121 and the camera 100 may be integrated. An object image formed on the image sensor 122 is encoded into a digital imaging signal. An image processing circuit 123 performs image processing such as noise reduction processing and white balance processing on the digital imaging signal to generate image data, and converts the image data into an image file in a JPEG format or the like in order to record the image data in a recording memory 126. The image processing circuit 123 generates from the image data VRAM image data to be displayed on the display 127.

A memory control circuit 124 controls transmission and reception of image data and the other data generated by the image processing circuit 123 and the like. A volatile memory 125 is a memory capable of high-speed reading and writing such as DDR3 SDRAM, and is used as, for example, a workspace for image processing that is performed by the image processing circuit 123. The recording memory 126 is a readable and writable recording medium such as an SD card and a CFexpress card that is attachable to and detachable from the camera 100 via an unillustrated connection unit. The display 127 is a display provided on a back surface of the camera 100 and includes an LCD panel, an organic EL display panel, and the like. A backlight circuit 128 adjusts the brightness of the display 127 by changing the light amount of the backlight of the display 127.

Each of a first power supply circuit for the accessory (first accessory power supply circuit hereinafter) 131 and a second power supply circuit for the accessory (second accessory power supply circuit hereinafter) 132 is a voltage conversion circuit that converts a voltage of power supply supplied from the system power supply circuit 112 into predetermined voltage and generates accessory power supply VACC having a voltage of 3.3 V in this embodiment. This configuration may convert the voltage into another voltage. The first accessory power supply circuit 131 is a circuit that includes LDO or the like and has a low self-power consumption. The second accessory power supply circuit 132 includes a DC/DC converter circuit or the like, and can pass current larger than current passed through the first accessory power supply circuit 131. The self-power consumption of the second accessory power supply circuit 132 is larger than the self-power consumption of the first accessory power supply circuit 131. Therefore, in a case where a load current is small, the first accessory power supply circuit 131 is more efficient than the second accessory power supply circuit 132, and in a case where the load current is large, the second accessory power supply circuit 132 is more efficient than the first accessory power supply circuit 131. The first camera control circuit 101 controls turning on and off of output from the first and second accessory power supply circuits 131 and 132 according to the operating state of the accessory 200.

A protection circuit 133 includes a current fuse element, a poly-switch element, an electronic fuse circuit in which a resistor, an amplifier, and a switching element are combined, or the like. The protection circuit 133 outputs overcurrent detecting signal DET_OVC that indicates an overcurrent by being at a high level, when power supply current values supplied to the accessory 200 from the first and second accessory power supply circuits 131 and 132 are higher than a predetermined value and become excessive (abnormal). In this embodiment, the protection circuit 133 is the electronic fuse circuit, and outputs the overcurrent detecting signal DET_OVC to the first camera control circuit 101 if a current of 1 A or more flows. The predetermined value may be different from 1 A.

The accessory 200 receives a power supply from a battery 205 and also receives a power supply from the camera 100 via the camera connection unit 141 and the accessory connection unit 211.

The accessory control circuit 201 is a microcomputer including a built-in CPU or the like and controls the entire accessory 200.

The accessory power supply circuit 202 includes a DCDC converter circuit, an LDO, a charge pump circuit, and the like, and generates a power supply for supplying power to each circuit in the accessory 200. Accessory microcomputer power supply VMCU_A having a voltage of 1.8 V generated by the accessory power supply circuit 202 is constantly supplied to the accessory control circuit 201. The voltage generated by the accessory power supply circuit 202 may be different from 1.8 V. The accessory control circuit 201 controls turning on and off of the power supply to each circuit of the accessory 200 by controlling the accessory power supply circuit 202.

A charging circuit 204 charges the battery 205 using the power supplied from the camera 100. The accessory control circuit 201 controls the charging circuit 204 to charge the battery 205 in a case where the accessory control circuit 201 determines that sufficient power is supplied from the camera 100 to perform a charging operation. In this embodiment, the battery 205 is attached to the accessory 200, but the accessory 200 may be operated only by a power supply from the camera 100 without the battery 205 attached. In this case, the charging circuit 204 is unnecessary.

A differential communication circuit 207 performs differential communication with the camera 100 and can transmit/receive data to/from the camera 100. An external communication IF circuit 208 is an IF circuit for performing data communication such as Ethernet communication, wireless LAN communication, and public network communication with an unillustrated external device. The accessory control circuit 201 controls the differential communication circuit 207 and the external communication IF circuit 208 to transmit data received from the camera 100 to the external device and data received from the external device to the camera 100.

A functional circuit 206 is a circuit having different functions depending on the type of the accessory 200. For example, in a case where the accessory 200 is a strobe device, the functional circuit 206 is a light-emitting circuit, a charging circuit, or the like. In a case where the accessory 200 is a microphone device, the functional circuit 206 is an audio codec circuit, a microphone circuit, or the like.

An external connection terminal 209 is a connection terminal for connection to an external device and is a USB TYPE-C connector in this embodiment. A connection detecting circuit 210 detects that an external device has been connected to the external connection terminal 209. The accessory control circuit 201 can detect the connection of the external device to the external connection terminal 209 by receiving an output signal of the connection detecting circuit 210.

A power supply switch 203 is a switch for turning on and off the operation of the accessory 200. The accessory control circuit 201 can detect a turning-on position and a turning-off position by reading a signal level of a terminal to which the power supply switch 203 is connected.

An operation unit 212 includes a button, a cross key, a slide switch, a dial switch, a touch sensor, and the like and is used for operating the accessory 200. The accessory control circuit 201 is capable of detecting an operation on the operation unit 212 and executes predetermined processing according to the operation in response to the detection of the operation. The operation on the operation unit is, for example, a short press, a long press, a double click, simultaneous presses on a plurality of operation units, a dial operation, and a combination of these operations.

The camera connection unit 141 is a connector for an electrical connection with the accessory 200 via 21 contacts TC01 to TC21 that are arranged in a row. The contacts TC01 to TC21 are arranged in this order along their arrangement direction.

The contact TC01 is connected to a ground (GND) and serves not only as a reference potential contact but also as a contact for controlling wiring impedances of the differential signals D1N and D1P.

The differential signals D1N and D1P that are connected to the contacts TC02 and TC03, respectively, are data communication signals that perform data communications in pairs. Signal lines connected to the contacts TC02 and TC03 are connected to the second camera control circuit 102.

The contact TC04 is connected to the GND and serves as a reference potential contact for the camera 100 and the accessory 200.

A signal line connected to the contact TC 05 is connected to the first and second accessory power supply circuits 131 and 132 via the protection circuit 133.

An accessory attachment detecting signal /ACC_DET pulled up to the camera microcomputer power supply VMCU_C via a resistor element Rp 134 (such as 10 kΩ) is communicated via a signal line connected to the contact TC06. The first camera control circuit 101 can detect whether or not the accessory 200 is attached by reading a signal level (potential) of the accessory attachment detecting signal /ACC_DET. Specifically, if the signal level of the accessory attachment detecting signal /ACC_DET is a high level (Hi), the first camera control circuit 101 detects that the accessory 200 is in a non-attached state, and if the signal level of the accessory attachment detecting signal /ACC_DET is a low level (Lo), the first camera control circuit 101 detects that the accessory 200 is in an attached state.

Changing the signal level (potential) of the accessory attachment detecting signal /ACC_DET from the high level to the low level when the camera 100 is powered on triggers various transmissions between the camera 100 and the accessory 200 via the contacts.

The camera control circuit 101 supplies power to the accessory 200 via the contact TC05 as a power supply contact in response to detecting the attachment of the accessory 200.

Signals SCLK, MOSI, MISO, and CS are communicated via signal lines connected to the contacts TC07, TC08, TC09, and TC10. These signals are signals for performing SPI communication in which the second camera control circuit 102 serves as a communication master. In the SPI communication in this embodiment, a communication clock frequency is 1 MHz, a data length is 8 bits (1 byte), a bit order is MSB first, and a communication method is a full-duplex communication method.

In this embodiment, the camera 100 and the accessory 200 support two types of communication protocols for the SPI communication method.

A first communication protocol is a method that does not confirm whether the accessory 200 is in a communicable state before the camera 100 outputs the signal SCLK, and is referred to as SPI protocol A in the following description.

Figure 2A:
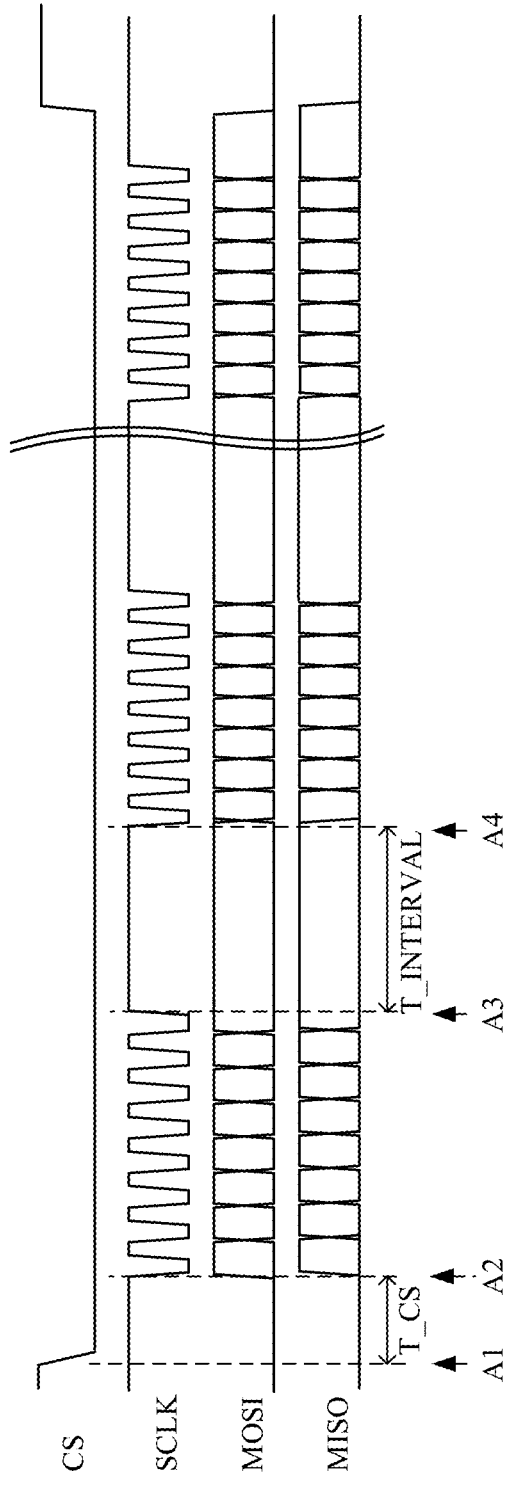
FIGS. 2A and 2B are diagrams each illustrating an example of a communication waveform of a protocol for SPI communication.

FIG. 2A illustrates an example of a communication waveform of the SPI protocol A. In FIG. 2A, the signal CS is low-active. The second camera control circuit 102 changes a signal level of the signal CS to a low level (Lo) at a timing A1 and requests the accessory control circuit 201 for the SPI communication. At a timing A2 a predetermined time T_CS after the timing A1, the second camera control circuit 102 starts outputting the signals SCLK and MOSI. When the accessory control circuit 201 detects a trailing edge of the signal SCLK, the accessory control circuit 201 starts outputting the signal MISO. The second camera control circuit 102 stops outputting the signal SCLK at a timing A3 at which output of 1-byte of the signal SCLK is completed. The second camera control circuit 102 resumes the output of the signal SCLK at a timing A4 after a predetermined time T_INTERVAL has elapsed from the timing A3.

Figure 3A:
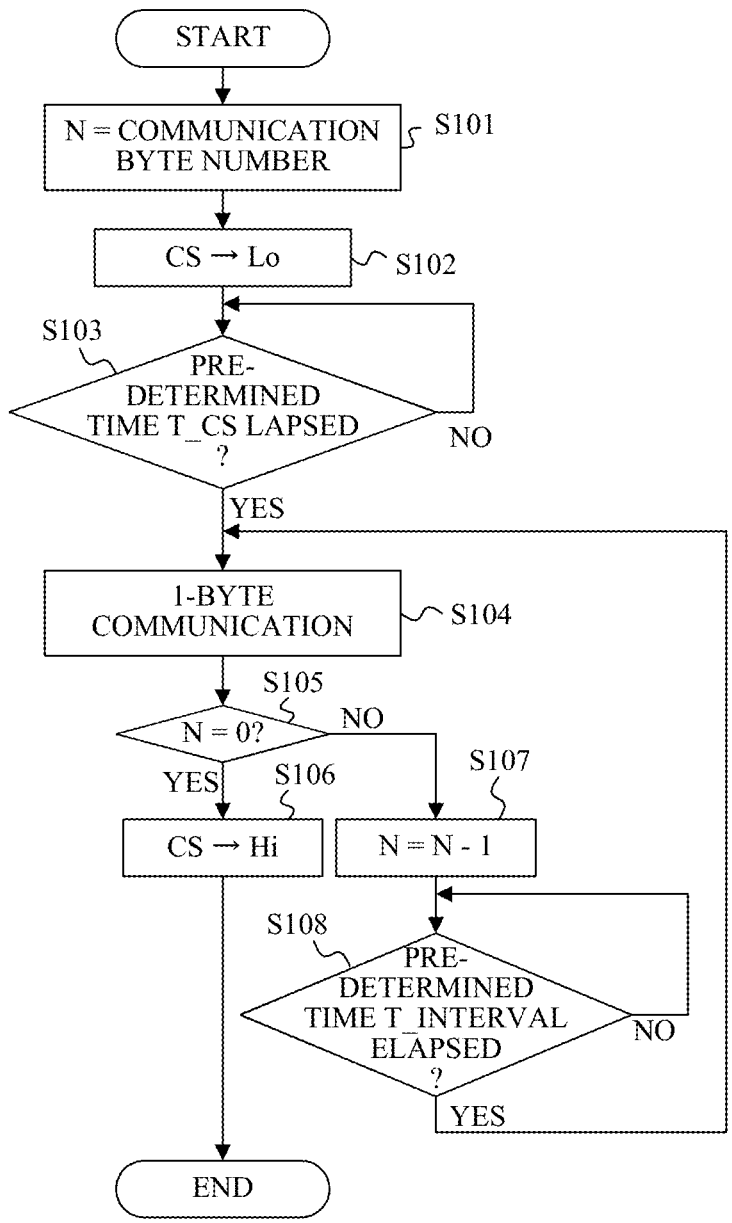
FIGS. 3A and 3B are diagrams illustrating operation flows in an SPI protocol A to be executed by a second camera control circuit and an accessory control circuit.

FIG. 3A illustrates an operation flow to be performed by the second camera control circuit 102 in the SPI protocol A.

In step S101, the second camera control circuit 102 stores the number of bytes to be communicated (communication byte number) in an internal variable N. For example, 3 is stored in a case of 3-byte communication.

In step S102, the second camera control circuit 102 changes the signal level of the signal CS to the low level and requests the SPI communication.

In step S103, the second camera control circuit 102 determines whether the predetermined time T_CS has elapsed since the signal level of the signal CS is changed to the low level. If it is determined that the predetermined time T_CS has elapsed, the flow proceeds to step S104, and if not, the processing of this step is repeated.

In step S104, the second camera control circuit 102 performs 1-byte communication. Specifically, the second camera control circuit 102 controls output of the signals SCLK and MOSI and input of the signal MISO.

In step S105, the second camera control circuit 102 determines whether or not the internal variable N indicating the number of communication bytes is 0. If it is determined that the internal variable N is 0, the flow proceeds to S106, and if not, the flow proceeds to step S107.

In S106, the second camera control circuit 102 changes the signal level of the signal CS to the high level and ends the SPI communication.

In S107, the second camera control circuit 102 stores, as a new internal variable N, a value acquired by decrementing the internal variable N by 1.

In step S108, the second camera control circuit 102 determines whether the predetermined time T_INTERVAL has elapsed since the 1-byte communication is completed. If it is determined that the predetermined time T_INTERVAL has elapsed, the flow proceeds to step S104, and if not, the processing of this step is repeated.

Figure 3B:
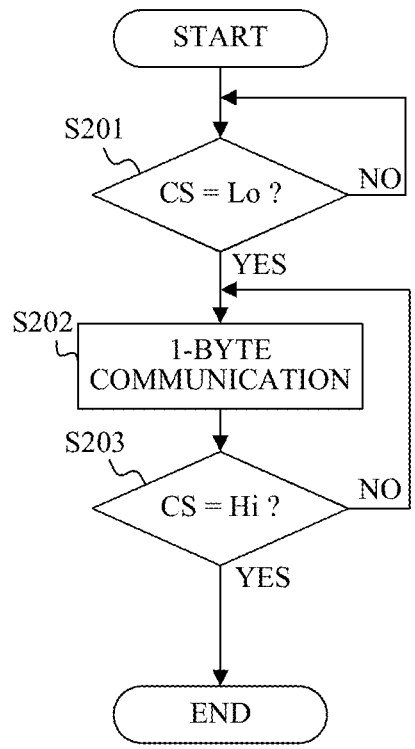

FIG. 3B illustrates an operation flow to be performed by the accessory control circuit 201 in the SPI protocol A.

In step S201, the accessory control circuit 201 determines whether or not the signal level of the signal CS has changed to the low level. If it is determined that the signal level of the signal CS has changed to the low level, the flow proceeds to step S202, and if not, the processing of this step is repeated.

In step S202, the accessory control circuit 201 performs 1-byte communication. Specifically, the accessory control circuit 201 controls the input of the signal MOSI and the output of the signal MISO in accordance with the input of the signal SCLK.

In S203, the accessory control circuit 201 determines whether or not the signal level of the signal CS has changed to the high level. If it is determined that the signal level of the signal CS has changed to the high level, the SPI communication is ended, and if not, the flow returns to S202.

A second communication protocol is a method that confirms whether the accessory 200 is in a communicable state before the camera 100 outputs the signal SCLK, and is referred to as SPI protocol B in this embodiment.

Figure 2B:
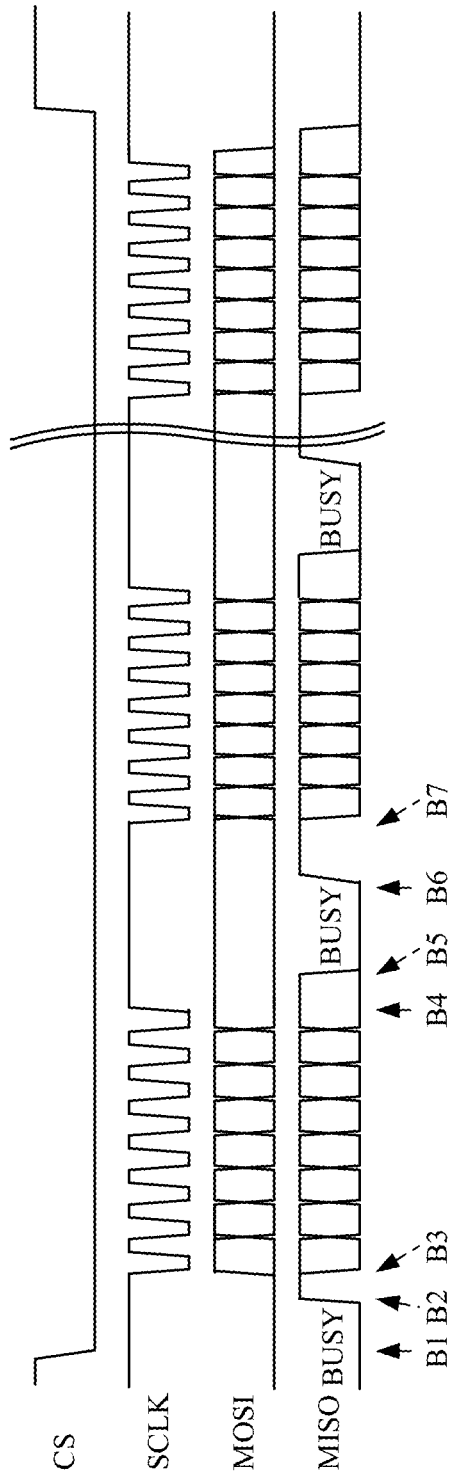

FIG. 2B illustrates an example of a communication waveform of the SPI protocol B. The second camera control circuit 102 changes the signal level of the signal CS to the low level at a timing B1 and requests the accessory control circuit 201 for the SPI communication. The second camera control circuit 102 confirms the signal level of the signal MISO in addition to performing the request for the SPI communication. If the signal level of the signal MISO is a high level (Hi), the second camera control circuit 102 determines that the accessory control circuit 201 is in a communicable state, and if the signal level of the signal MISO is a low level (Lo), the second camera control circuit 102 determines that the accessory control circuit 201 is in an incommunicable state. After detecting a trailing edge of the signal CS, the accessory control circuit 201 sets the signal level of the signal MISO to the high level if the accessory control circuit 201 is in the communicable state, and sets the signal level of the signal MISO to the low level if the accessory control circuit 201 is in the incommunicable state. In FIG. 2B, the accessory control circuit 201 sets the signal level of the signal MISO to the high level at a timing B2. When the second camera control circuit 102 confirms that the signal level of the signal MISO is the high level, the second camera control circuit 102 starts outputting the signals SCLK and MOSI at a timing B3. The accessory control circuit 201 starts outputting the signal MISO when detecting a trailing edge of the signal SCLK. The second camera control circuit 102 stops outputting the signal SCLK at a timing B4 at which output of 1-byte of the signal SCLK is completed. After the 1-byte communication, the accessory control circuit 201 sets the signal level of the signal MISO to the high level if the SPI communication is available, and sets the signal level of the signal MISO to the low level if the SPI communication is unavailable. In FIG. 2B, the accessory control circuit 201 sets the signal level of the signal MISO to the low level at a timing B5 and sets the signal level of the signal MISO to the high level at a timing B6. The second camera control circuit 102 confirms the signal level of the signal MISO at a timing B7. If the signal level of the signal MISO is the high level, the second camera control circuit 102 determines that the accessory control circuit 201 is in the communicable state, and if the signal level of the signal MISO is the low level, the second camera control circuit 102 determines that the accessory control circuit 201 is in the incommunicable state.

FIG. 4A illustrates an operation flow to be performed by the second camera control circuit 102 in the SPI protocol B.

In step S111, the second camera control circuit 102 stores the number of bytes to be communicated in the internal variable N.

In step S112, the second camera control circuit 102 changes the signal level of the signal CS to the low level and requests the SPI communication.

In step S113, the second camera control circuit 102 determines whether the signal level of the signal MISO has changed to the high level. If it is determined that the signal level of the signal MISO has been changed to the high level, the flow proceeds to step S114, and if not, the processing of this step is repeated.

In step S114, the second camera control circuit 102 performs 1-byte communication. Specifically, the second camera control circuit 102 controls output of the signals SCLK and MOSI and input of the signal MISO.

In step S115, the second camera control circuit 102 determines whether or not the internal variable N indicating the number of communication bytes is 0. If it is determined that the internal variable N is 0, the flow proceeds to step S116, and if not, the flow proceeds to step S117.

In step S116, the second camera control circuit 102 changes the signal level of the signal CS to the high level and ends the SPI communication.

In step S117, the second camera control circuit 102 stores, as new internal variable N, a value acquired by decrementing the internal variable N by 1.

In step S118, the second camera control circuit 102 determines whether or not the signal level of the signal MISO has changed to a high level. If it is determined that the signal level of the signal MISO has been changed to the high level, the flow returns to step S114, and if not, the processing of this step is repeated.

FIG. 4B illustrates an operation flow to be performed by the accessory control circuit 201 in the SPI protocol B.

In step S211, the accessory control circuit 201 determines whether or not the signal level of the signal CS has changed to the low level. If it is determined that the signal level of the signal CS has changed to the low level, the flow proceeds to step S212, and if not, the processing of this step is repeated.

In step S212, the accessory control circuit 201 determines whether or not the SPI communication is available. If it is determined that the SPI communication is available, the flow proceeds to step S213, and if not, the flow proceeds to step S214.

In step S213, the accessory control circuit 201 sets the signal level of the signal MISO to the high level.

In step S214, the accessory control circuit 201 sets the signal level of the signal MISO to the low level.

In S215, the accessory control circuit 201 performs 1-byte communication. Specifically, the accessory control circuit 201 controls input of the signal MOSI and output of the signal MISO in accordance with input of the signal SCLK.

In S216, the accessory control circuit 201 determines whether or not the signal level of the signal CS has changed to the high level. If it is determined that the signal level of the signal CS has changed to the high level, the SPI communication is ended, and if not, the flow returns to step S212.

FIG. 5 illustrates an example of SPI communication contents when the camera 100 notifies the accessory 200 of an operation execution instruction (command).

The second camera control circuit 102 transmits, as MOSI data, a command number CMD in first-byte communication. The accessory control circuit 201 transmits, as MISO data, a value of 0xA5 indicating that the accessory control circuit 201 is in the communicable state. In a case where the first-byte communication processing cannot be executed, the accessory control circuit 201 transmits, as the MISO data, information other than the value of 0xA5.

The second camera control circuit 102 transmits argument MOSI_DATA1 corresponding to the command number CMD in second-byte communication. In third-byte communication to (N−2)th-byte communication, the second camera control circuit 102 transmits arguments MOSI_DATA2 to MOSI_DATA [N−3] corresponding to the command number CMD.

On the other hand, in the second-byte communication, the accessory control circuit 201 transmits, as MISO data, the command number CMD received in the first-byte communication. This configuration enables the second camera control circuit 102 to determine whether the accessory control circuit 201 has correctly received the MOSI data.

The accessory control circuit 201 transmits, as MISO data, a return value MISO_DATA1 corresponding to the command number CMD in the third-byte communication. In fourth-byte communication to the (N−2)th-byte communication, the accessory control circuit 201 transmits arguments MISO_DATA2 to MISO_DATA [N−4] corresponding to the command number CMD. Assume that the number of arguments and the number of return values are determined in advance for each command number. One or both of the argument and the return value may be omitted.

The second camera control circuit 102 transmits, as MOSI data, checksum data CheckSum_C calculated by the following expression in (N−1)th-byte communication.

$$CheckSum\_C = EXOR(AND(SUM(CMD, MOSI\_DATA1, \ldots, MOSI\_DATA [N-3]), 0xFF), 0xFF)$$

On the other hand, the accessory control circuit 201 transmits a value of 0x00 as the MISO data in the (N−1)th-byte communication.

The second camera control circuit 102 transmits the value of 0x00 as the MOSI data in Nth-byte communication.

On the other hand, the accessory control circuit 201 transmits checksum data CheckSum_A as the MISO data in the Nth-byte communication.

If the checksum data CheckSum_C received by the second camera control circuit 102 and the checksum data CheckSum_C calculated by the second camera control circuit 102 accord with each other, the checksum data CheckSum_A is calculated by the following expression.

$$CheckSum\_A = EXOR(AND(SUM(0xA5, CMD, MISO\_DATA1, \ldots, MISO\_DATA [N-4]), 0xFF), 0xFF)$$

If the checksum data CheckSum_C received by the second camera control circuit 102 and the checksum data CheckSum_C calculated by the second camera control circuit 102 do not accord with each other, the checksum data CheckSum_A is calculated by the following expression.

$$CheckSum\_A = AND(SUM(0xA5, CMD, MISO\_DATA1, \ldots, MOSI\_DATA [N-4]), 0xFF)$$

A communication request signal /WAKE for the accessory 200 to request the first camera control circuit 101 for communication is communicated via a signal line connected to the contact TC11. The communication request signal /WAKE is pulled up to the camera microcomputer power supply VMCU_C via a resistor. The first camera control circuit 101 can receive a communication request from the accessory 200 by detecting a trailing edge of the communication request signal /WAKE.

Signals SDA and SCL for performing I2C communication in which the first camera control circuit 101 serves as a communication master are communicated via signal lines connected to the contacts TC12 and TC13, respectively. The I2C communication is open-drain communication pulled up to the camera microcomputer power supply VMCU_C and has communication frequencies of 100 kbps in this embodiment. In the I2C communication, both data transmission from the camera 100 and data transmission from the accessory 200 are performed via SDA. When the SPI communication and the I2C communication are compared with each other, a communication speed of the I2C communication is lower than a communication speed of the SPI communication. The SPI communication has a communication speed higher than the communication speed of the I2C communication and therefore is suitable for information communication of a large amount of data. Therefore, in the communication between the camera 100 and the accessory 200 in this embodiment, information having a large amount of data is communicated by using the SPI communication, and information having a small amount of data is communicated by using the I2C communication. For example, data is first communicated by using the I2C communication, and when the SPI communication is available or has to be executed based on this data, control can be made to further execute the SPI communication.

Figure 20A:
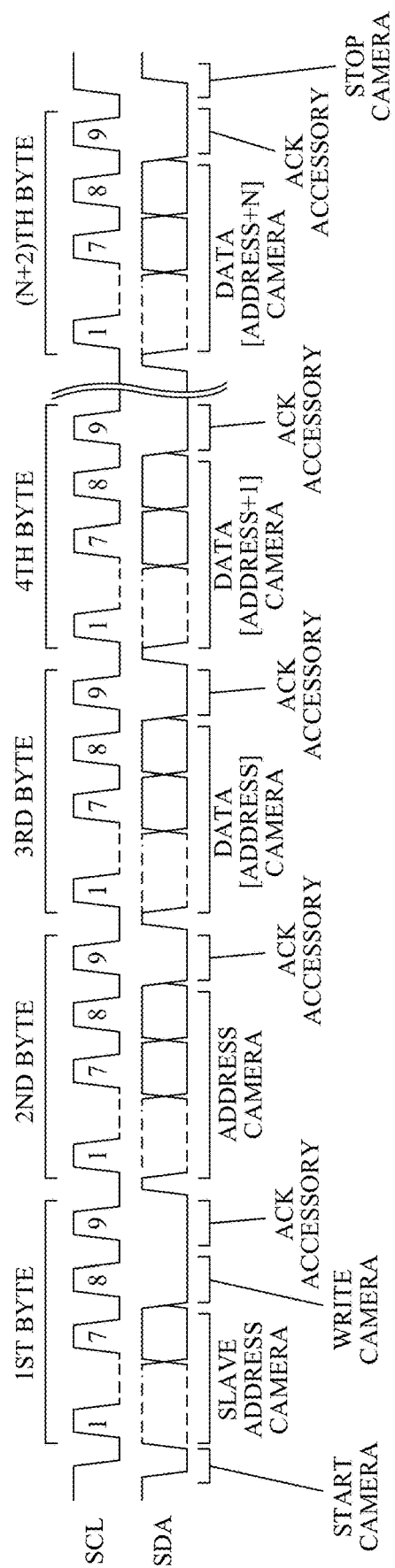
FIGS. 20A and 20B are diagrams illustrating examples of I2C communication waveforms.
Figure 20B:
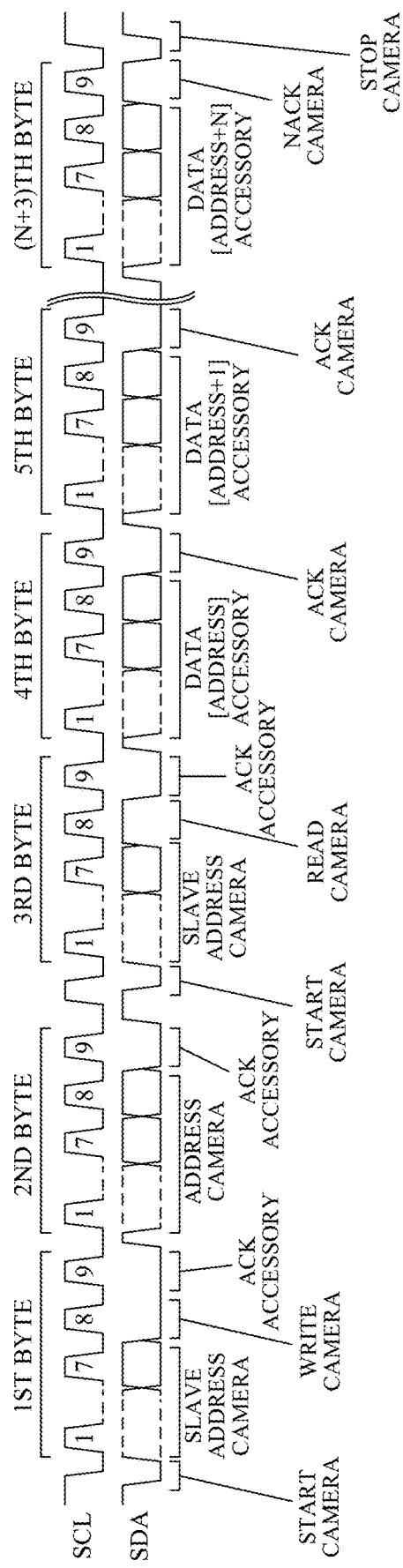

FIGS. 20A and 20B are diagrams illustrating examples of I2C communication waveforms. FIG. 20A illustrates a waveform example in a case where the camera 100 transmits N-byte data (DATA [1] to DATA [N]) to the accessory 200, and FIG. 20B illustrates a waveform example in a case where the camera 100 receives N-byte data (DATA [1] to DATA [N]) from the accessory 200.

In each of FIGS. 20A and 20B, an upper waveform is SCL and a lower waveform is SDA.

Illustrated below the SDA waveform is the meaning of a signal at each timing and whether a control circuit for controlling the output level of the SDA signal is the first camera control circuit 101 or the accessory control circuit 201.

The communication data includes 1-byte unit data and 1-bit information indicating a response. The number of bytes of data from the communication start is given at a top of each figure for simplicity.

Details of the communication contents will be described below with reference to flowcharts of FIGS. 21 to 23B, and thus an outline will be described with reference to FIGS. 20A and 20B.

In FIG. 20A, in first-byte communication and second-byte communication, the first camera control circuit 101 notifies the accessory control circuit 201 of storage address information on data to be transmitted.

In third-byte communication to (N+2)th-byte communication, the first camera control circuit 101 transmits N-byte data (DATA [ADDRESS] to DATA [ADDRESS+N]) to the accessory control circuit 201.

In FIG. 20B, in first-byte communication and second-byte communication, the first camera control circuit 101 notifies the accessory control circuit 201 of storage address information on data to be received.

In third-byte communication to (N+3)th-byte communication, the first camera control circuit 101 receives N-byte data (DATA [ADDRESS] to DATA [ADDRESS+N]) from the accessory control circuit 201.

Next, flowcharts of FIGS. 21 to 23B will be described.

Figure 21:
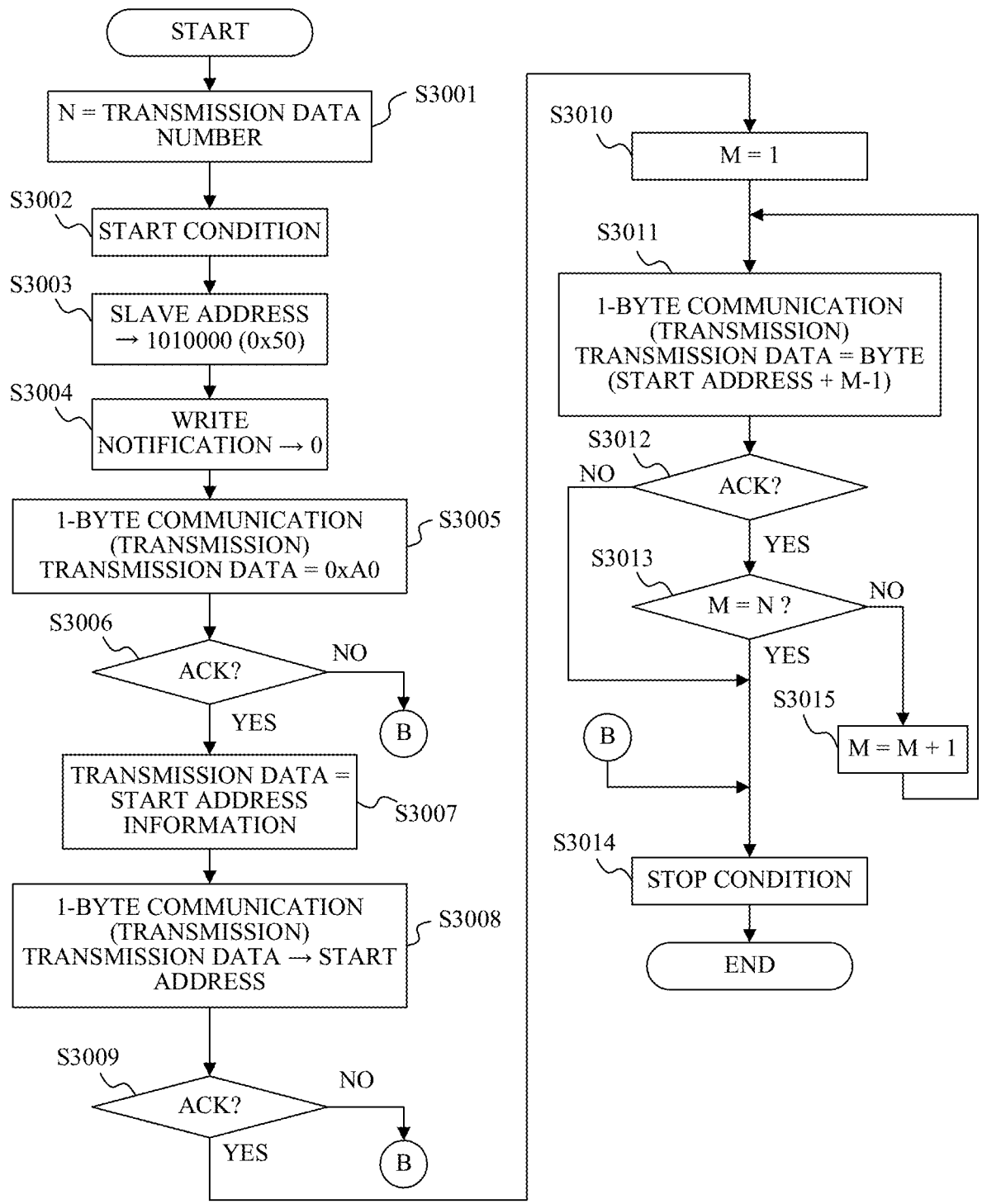
FIG. 21 is a diagram illustrating processing to be performed by the camera control circuit when N-byte data is transmitted from the camera control circuit to the accessory control circuit.

A flowchart in FIG. 21 illustrates processing to be performed by the first camera control circuit 101 when the first camera control circuit 101 transmits N-byte data to the accessory control circuit 201.

In step S3001, the first camera control circuit 101 stores a numerical value indicating the number of bytes to be transmitted in the internal variable N. For example, when 3 bytes are to be transmitted, 3 is stored. In this embodiment, 3 is stored.

In step S3002, the first camera control circuit 101 changes SDA to a low level (Lo) while SCL is at a high level (Hi) (START condition). Thereby, the accessory control circuit 201 is notified of a communication start.

In step S3003, the first camera control circuit 101 sets slave address information indicating a slave address of the accessory control circuit 201 to the upper 7 bits of the transmission data. In this embodiment, assume that the slave address of the accessory control circuit 201 is 1010000 in binary.

In step S3004, the first camera control circuit 101 sets information indicating that it is writing communication to the lower 1 bit of the transmission data. Setting this bit to 0 means the writing communication.

In step S3005, the first camera control circuit 101 transmits to the accessory control circuit 201 data that has been set as the transmission data in step S3003 and step S3004 (10100000 in binary and 0xA0 in hexadecimal).

In step S3006, the first camera control circuit 101 outputs SCL for one clock and confirms the signal level of SDA after transmitting the 1-byte data. In a case where the signal level of SDA is the low level, it is determined to be a data reception notification (ACK) from the accessory control circuit 201 and the flow proceeds to step S3007. On the other hand, in a case where the signal level of SDA is a high level (Hi), it is determined that the accessory control circuit 201 has not normally received the data and the flow proceeds to step S3014.

In step S3007, the first camera control circuit 101 sets to transmission data the storage address information (start address information) on the data to be transmitted to the accessory control circuit 201. In this embodiment, the size of the start address information is 1 byte, and the value of the start address information is 0x00.

In step S3008, the first camera control circuit 101 transmits the set 1-byte start address information (value of 0x00) to the accessory control circuit 201.

In step S3009, the first camera control circuit 101 outputs SCL for one clock and confirms the signal level of SDA after transmitting the 1-byte start address information data. In the case where the signal level of SDA is the low level, it is determined to be the data reception notification (ACK) from the accessory control circuit 201 and the flow proceeds to step S3010. On the other hand, in the case where the signal level of SDA is the high level, it is determined that the accessory control circuit 201 has not normally received the data and the flow proceeds to step S3014.

In step S3010, the first camera control circuit 101 stores 1 in an internal variable M. The internal variable M is a variable for counting the number of transmitted data.

In step S3011, the first camera control circuit 101 outputs 1-byte SCL and outputs 1-byte data to the accessory control circuit 201 by changing SDA to a desired signal level while SCL is at a low level (Lo). Here, the start address information is 0x00 and the internal variable M is 1, and thus 1-byte data corresponding to the address 0x00 is transmitted.

In step S3012, the first camera control circuit 101 outputs SCL for one clock and confirms the signal level of SDA after transmitting the 1-byte data. In the case where the signal level of SDA is the low level, it is determined to be the data reception notification (ACK) from the accessory control circuit 201 and the flow proceeds to step S3013. On the other hand, in the case where the signal level of SDA is the high level, it is determined that the accessory control circuit 201 has not normally received the data and the flow proceeds to step S3014.

In step S3013, the first camera control circuit 101 confirms whether the internal variable M has the same value as a value of the internal variable N. In a case where the internal variable M has the same value as the value of the internal variable N, it is determined that the transmissions of all data have been completed and the flow proceeds to step S3014. In a case where the internal variable M is not the same value as the value of the internal variable N, it is determined that there are still data to be transmitted and the flow proceeds to step S3015.

In step S3015, the first camera control circuit 101 adds 1 to the internal variable M and the flow returns to step S3011.

Thus, after the flow returns to step S3011, the first camera control circuit 101 sequentially increments the addresses of the data to be transmitted, and transmits 1-byte data corresponding to each address. In this way, the first camera control circuit 101 transmits N-byte data to the accessory control circuit 201 by repeatedly transmitting 1-byte data until the internal variable M and the internal variable N have the same value in the processing in step S3013. In the case where the internal variable N is set to 3 as in this embodiment, 3-byte data can be transmitted.

In step S3014, the first camera control circuit 101 changes SDA to the high level while SCL is at a high level (Hi) (STOP condition). Thereby, the accessory control circuit 201 is notified of a communication end.

Figure 22:
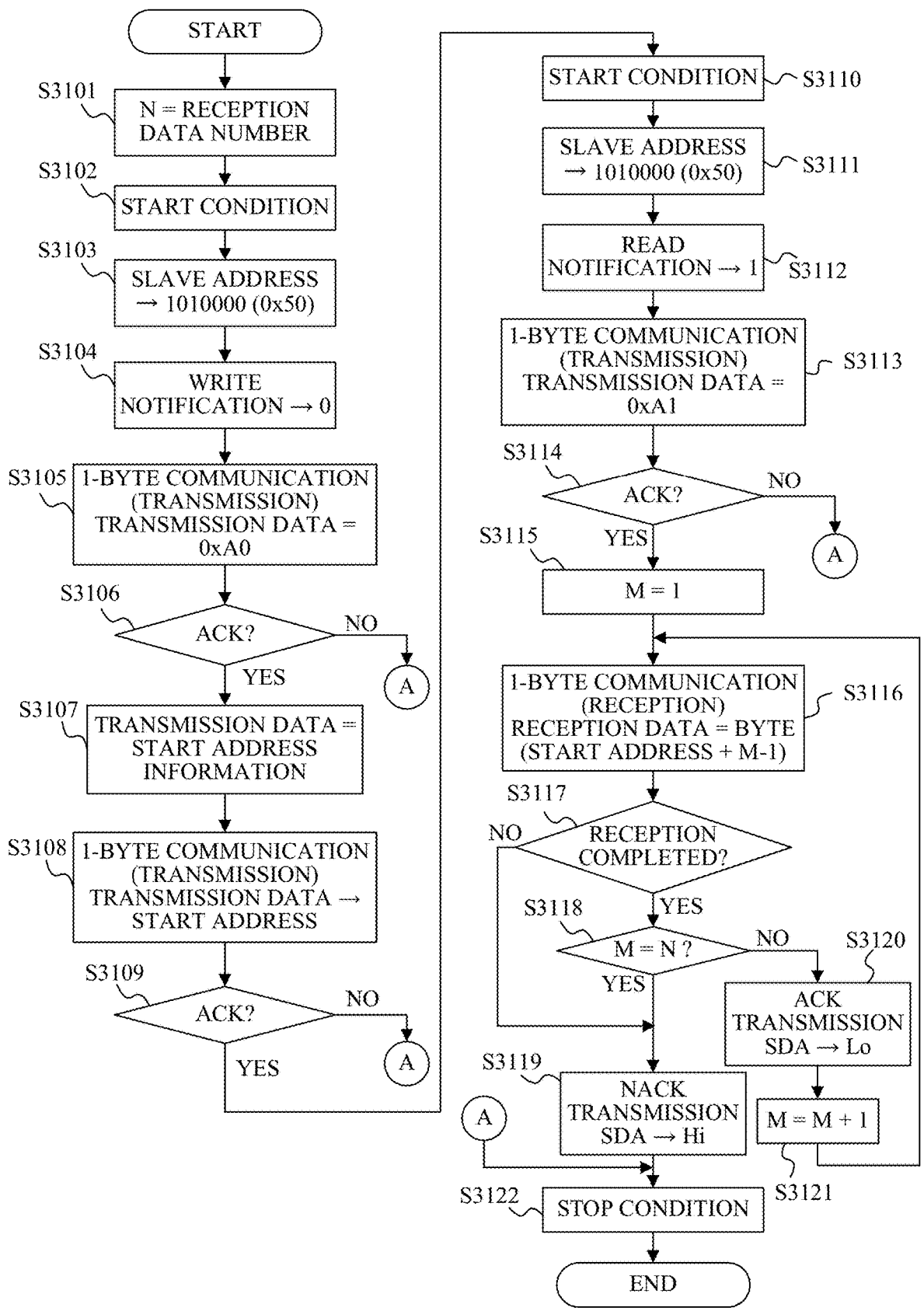
FIG. 22 is a diagram illustrating processing to be performed by the camera control circuit when N-byte data from the accessory control circuit is received by the camera control circuit.

A flowchart in FIG. 22 illustrates processing to be performed by the first camera control circuit 101 when the first camera control circuit 101 receives N-byte data from the accessory control circuit 201.

In step S3101, the first camera control circuit 101 stores a numerical value indicating the number of bytes to be received in the internal variable N. For example, in a case where 3-byte data is received, 3 is stored. In this embodiment, 3 is stored.

In steps S3102 to S3106, the first camera control circuit 101 performs the same processing as steps S3002 to S3006, respectively, and thus a description thereof will be omitted.

In step S3107, the first camera control circuit 101 sets to transmission data storage address information (start address information) of the data received from the accessory control circuit 201. In this embodiment, the size of the start address information is 1 byte, and the value of the start address information is 0x00.

In step S3108, the first camera control circuit 101 transmits the set 1-byte start address information (value of 0x00) to the accessory control circuit 201.

In step S3109, the first camera control circuit 101 outputs SCL for one clock and confirms the signal level of SDA after transmitting the 1-byte start address information data. In the case where the signal level of SDA is the low level, it is determined to be the data reception notification (ACK) from the accessory control circuit 201, and the flow proceeds to step S3110. On the other hand, in the case where the signal level of SDA is the high level, it is determined that the accessory control circuit 201 has not normally received the data and the flow proceeds to step S3122.

In step S3110, the first camera control circuit 101 changes SDA to the low level while SCL is at the high level, and notifies the accessory control circuit 201 of the START condition, as in step S3102.

In step S3111, the first camera control circuit 101 sets the slave address information indicating the slave address of the accessory control circuit 201 to the upper 7 bits of the transmission data. In this embodiment, assume that the slave address of the accessory control circuit 201 is 1010000 in binary.

In step S3112, the first camera control circuit 101 sets the information indicating that it is reading communication to the lower 1 bit of the transmission data. Setting this bit to 1 means the reading communication.

In step S3113, the first camera control circuit 101 transmits to the accessory control circuit 201 data (10100001 in binary and 0xA1 in hexadecimal) that has been set as the transmission data in step S3003 and step S3004.

In step S3114, the first camera control circuit 101 outputs SCL for one clock and confirms the signal level of SDA after transmitting the 1-byte data. In the case where the signal level of SDA is the low level, it is determined to be the data reception notification (ACK) from the accessory control circuit 201, and the flow proceeds to step S3115. On the other hand, in the case where the signal level of SDA is the high level, it is determined that the accessory control circuit 201 has not normally received the data, and the flow proceeds to step S3122.

In step S3115, the first camera control circuit 101 stores 1 in the internal variable M. The internal variable M is a variable for counting the number of received data.

In step S3116, the first camera control circuit 101 outputs 1-byte SCL and reads the signal level of SDA at a timing when SCL changes from the low level to the high level. This configuration enables the 1-byte data to be received from the accessory control circuit 201. The received 1-byte data can be stored in the volatile memory 125 or used for predetermined processing as data corresponding to the address 0x00.

In step S3117, the first camera control circuit 101 determines whether or not 1-byte data has normally been received. If the normal reception has been performed, the flow proceeds to step S3118, and if the normal reception has not been performed, the flow proceeds to step S3119.

In step S3118, the first camera control circuit 101 confirms whether the internal variable M has the same value as the value of the internal variable N. If the internal variable M has the same value as the value of the internal variable N, it is determined that the reception of all data have been completed and the flow proceeds to step S3119. If the internal variable M is not the same value as the value of the internal variable N, it is determined that there are still data to be received and the flow proceeds to step S3120.

In step S3120, the first camera control circuit 101 outputs 1-byte SCL and provides the accessory control circuit 201 with a data reception notification (ACK) and notifies the accessory control circuit 201 of performing continuous data communication by performing control for changing SDA to the low level.

In step S3121, the first camera control circuit 101 adds 1 to the internal variable M and the flow returns to step S3116.

Thus, after the flow returns to step S3116, the first camera control circuit 101 sequentially increments the address of the data to be received, and receives 1-byte data corresponding to each address. In this way, the first camera control circuit 101 receives N-byte data from the accessory control circuit 201 by repeatedly receiving 1-byte data until the internal variable M and the internal variable N have the same value in the processing in step S3118. In the case where the internal variable N is set to 3 as in this embodiment, 3-byte data can be received.

In step S3119, the first camera control circuit 101 outputs 1-byte SCL and performs control for changing SDA to the high level to notify the accessory control circuit 201 that the data communication has been completed (NACK).

In step S3122, the first camera control circuit 101 changes SDA to the high level while SCL is at the high level (STOP condition). Thereby, the accessory control circuit 201 is notified of a communication end.

Figure 23A:
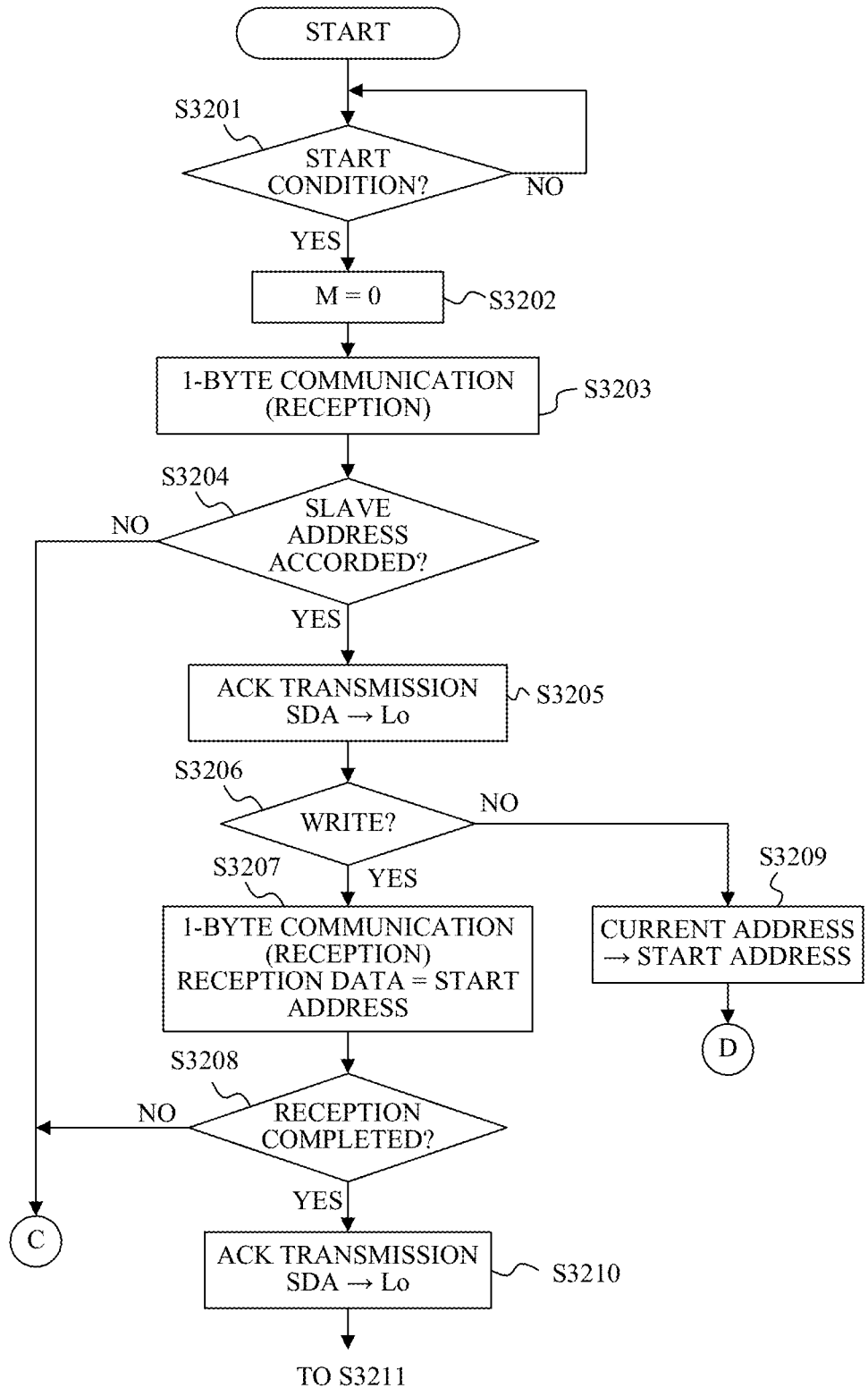
FIGS. 23A and 23B are diagrams illustrating processing to be performed by the accessory control circuit when N-byte data is communicated between the camera control circuit and the accessory control circuit.
Figure 23B:
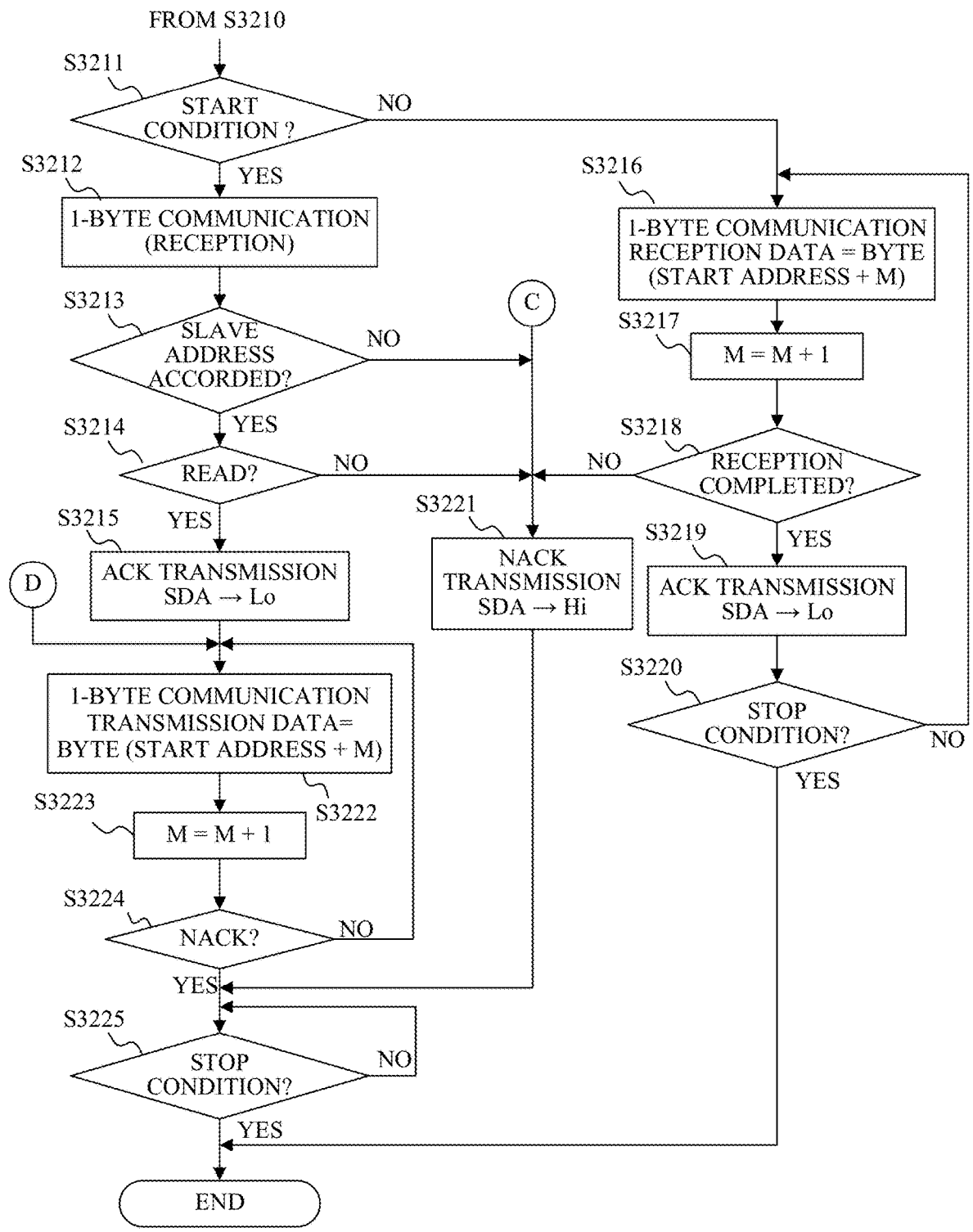

Flowcharts in FIGS. 23A and 23B illustrate processing to be performed by the accessory control circuit 201 in the case where the first camera control circuit 101 transmits N-byte data to the accessory control circuit 201 and in the case where the first camera control circuit 101 receives N-byte data from the accessory control circuit 201.

In step S3201, the accessory control circuit 201 waits for SDA to change to the low level while SCL is at the high level (START condition). If the accessory control circuit 201 detects the START condition, the flow proceeds to step S3202.

In step S3202, the accessory control circuit 201 stores 0 in an internal variable M. The internal variable M is a variable for counting the number of transmitted data and the number of received data.

In step S3203, the accessory control circuit 201 receives 1-byte data transmitted from the first camera control circuit 101.

In step S3204, the accessory control circuit 201 determines whether the upper 7-bit data of the 1-byte data received in step S3203 accords with the slave address (0x50 in this embodiment) of the accessory control circuit 201. In a case where the address accords with the slave address of the accessory control circuit 201, the flow proceeds to step S3205. In a case where the address does not accord with the slave address of the accessory control circuit 201, the flow proceeds to step S3221.

In step S3205, the accessory control circuit 201 provides the first camera control circuit 101 with the data reception notification (ACK) by performing control for changing SDA to the low level for the next SCL clock output after receiving the 1-byte data.

In step S3206, the accessory control circuit 201 determines the type of data for the next 1-byte communication based on the lower 1-bit data of the 1-byte data received in step S3203. In the case where the lower 1-bit data is 0, it is determined that the data of the next 1-byte communication is start address information from the first camera control circuit 101 to the accessory control circuit 201 and the flow proceeds to step S3207. In the case where the lower 1-bit data is 1, it is determined that the data of the next 1-byte communication is transmission data from the accessory control circuit 201 to the first camera control circuit 101 and the flow proceeds to step S3209.

In step S3207, the accessory control circuit 201 receives 1-byte data transmitted from the first camera control circuit 101. The received 1-byte data is information indicating addresses in which data to be transmitted and received in the subsequent communication is stored. In this embodiment, assume that start address information is 0x00 as described with reference to FIGS. 21 and 22.

On the other hand, in step S3209, the accessory control circuit 201 uses, for the start address information, address information previously stored in the accessory control circuit 201 or the address information previously notified from the first camera control circuit 101.

In step S3208, in a case where the accessory control circuit 201 determines that the 1-byte data has normally been received, the flow proceeds to step S3210. In a case where the accessory control circuit 201 determines that the 1-byte data has not normally been received, the flow proceeds to step S3221.

In step S3210, the accessory control circuit 201 provides the first camera control circuit 101 with the data reception notification (ACK) by performing control for changing SDA to the low level for the next SCL clock output after receiving the 1-byte data.

In step S3211, the accessory control circuit 201 confirms whether SDA has changed to the low level while SCL is at a high level (START condition). If the accessory control circuit 201 detects the START condition, the accessory control circuit 201 determines that 1-byte data to be communicated next is data to be transmitted from the first camera control circuit 101 to the accessory control circuit 201 and is data indicating a slave address and a communication type. Then, the flow proceeds to step S3212. If the accessory control circuit 201 does not detect the START condition, the accessory control circuit 201 determines that the 1-byte data to be communicated next is data information received by the accessory control circuit 201 from the first camera control circuit 101. Then, the flow proceeds to step S3216.

In step S3212, the accessory control circuit 201 receives the 1-byte data transmitted from the first camera control circuit 101.

In step S3213, the accessory control circuit 201 determines whether the upper 7-bit data of the 1-byte data received in step S3212 accords with the slave address (0x50 in this embodiment) of the accessory control circuit 201. In the case where the upper 7-bit data accords with the slave address of the accessory control circuit 201, the flow proceeds to step S3214. In the case where the upper 7-bit data does not accord with the slave address of the accessory control circuit 201, the flow proceeds to step S3221.

In step S3214, the accessory control circuit 201 determines a data type for the next 1-byte communication based on the lower 1-bit data of the 1-byte data received in step S3203. In a case where the lower 1-bit data is 0, the flow proceeds to step S3221. In a case where the lower 1-bit data is 1, it is determined that the data of the next 1-byte communication is transmission data from the accessory control circuit 201 to the first camera control circuit 101 and the flow proceeds to step S3215.

In step S3215, the accessory control circuit 201 provides the first camera control circuit 101 with the data reception notification (ACK) by performing control for changing SDA to the low level for the next SCL clock output after receiving the 1-byte data.

In step S3222, the accessory control circuit 201 transmits to the first camera control circuit 101 1-byte data corresponding to the start address information received from the first camera control circuit 101 in step S3207 or the start address information determined in step S3209.

In step S3223, the accessory control circuit 201 adds 1 to the internal variable M, and the flow proceeds to step S3224.

In step S3224, the accessory control circuit 201 confirms the signal level of SDA after transmitting the 1-byte data. In a case where the signal level of SDA is the high level, the first camera control circuit 101 determines that it is the notification (NACK) that all data has been received, and the flow proceeds to step S3225. On the other hand, in a case where the signal level of SDA is the low level, it is determined that the first camera control circuit 101 continues to request a data transmission from the accessory control circuit 201, and the flow returns to step S3222. Thus, after the flow returns to step S3222, the accessory control circuit 201 sequentially increments the address of the data to be transmitted, and transmits 1-byte data corresponding to each address. Thus, by repeatedly transmitting the 1-byte data until NACK is notified by the first camera control circuit 101 in the processing in step S3224, the accessory control circuit 201 transmits N-byte data to the first camera control circuit 101.

In step S3225, the accessory control circuit 201 waits for the SDA to change to the high level while SCL is at the high level (STOP condition). If the accessory control circuit 201 detects the STOP condition, the communication is ended.

On the other hand, in step S3216, the accessory control circuit 201 receives 1-byte data. The accessory control circuit 201 stores the 1-byte data in a nonvolatile memory as data corresponding to the start address information received from the first camera control circuit 101 in step S3207 or uses the 1-byte data in predetermined processing.

In step S3217, the accessory control circuit 201 adds 1 to the internal variable M and the flow proceeds to step S3218.

In step S3218, if the accessory control circuit 201 determines that the 1-byte data has normally been received, the flow proceeds to step S3219. If the accessory control circuit 201 determines that the 1-byte data has not normally been received, the flow proceeds to step S3221.

In step S3219, the accessory control circuit 201 provides the first camera control circuit 101 with the data reception notification (ACK) by performing control for changing SDA to the low level for the next SCL clock output after receiving the 1-byte data.

In step S3230, the accessory control circuit 201 confirms whether it has detected that the SDA changes to the high level while SCL is at the high level (STOP condition). In the case where the accessory control circuit 201 detects the STOP condition, the accessory control circuit 201 ends the communication. On the other hand, in the case where the accessory control circuit 201 does not detect the STOP condition, the accessory control circuit 201 determines that data will be continuously transmitted from the first camera control circuit 101 to the accessory control circuit 201. Then, the flow returns to step S3216.

Thus, after the flow returns to step S3216, the accessory control circuit 201 sequentially increments an address of data to be received, and receives 1-byte data corresponding to each address. By repeatedly receiving the 1-byte data until the STOP condition is notified in step S3220, the accessory control circuit 201 receives N-byte data from the first camera control circuit 101.

Function signals FNC1, FNC2, FNC3, and FNC4 whose functions are variable depending on the type of the accessory 200 are communicated via signal lines connected to the contacts TC14, TC15, TC16, and TC17, respectively. For example, in a case where the accessory 200 is a microphone device, a signal communicated via TC15 is an audio data signal, and in a case where the accessory 200 is an illumination device (strobe unit), a signal communicated via TC 14 is a signal that notifies a light emission timing.

Signal that realizes different functions may be communicated via the same contact depending on the type of the attached accessory. For example, in a case where the accessory 200 is an accessory other than an illumination device, a synchronization signal for a controlling timing different from a light emission timing may be communicated via TC14. TC14 to TC17 correspond to functional signal contacts. Communication using at least one of the functional signal contacts is also referred to as functional signal communication.

The functional signal communication can be executed at a timing independent of the I2C communication and the SPI communication in parallel with the I2C communication and the SPI communication.

The accessory type, as used herein, means the above microphone device, illumination device, etc. Accessories that achieve functions having the same purpose, such as illuminations with different performances, belong to the same type of accessories. Accessories that achieve functions having different purposes, such as a microphone device and an illumination device, are different types of accessories.

The functional signal communication is executed based on information acquired by the I2C communication or the SPI communication.

The contact TC18 is connected to the GND and is a contact that serves as a reference potential contact for the camera 100 and the accessory 200.

Differential signals D2N and D2P communicated via signal lines connected to the contacts TC19 and TC20 are data communication signals that perform data communication in pairs. Signal lines connected to the contacts TC19 and TC20 are connected to the second camera control circuit 102. For example, USB communication can be performed via TC19 and TC20.

The contact TC21 is connected to the GND and serves not only as a reference potential contact but also as a contact for controlling wiring impedances of the differential signals D2N and D2P. The contacts TC01, TC04, TC06, TC18, and TC21 are connected to, for example, a GND portion of a flexible printed circuits substrate, and the GND portion of the flexible printed circuits substrate is fixed to a metallic member which serves as the GND level of the camera 100, with a screw or the like. The metallic member serving as the GND level includes, for example, an engagement member engageable with the accessory 200 in an accessory shoe portion, an unillustrated base plate inside the camera 100, and the like.

In this embodiment, the attachment detecting contact TC06 to which the accessory attachment detecting signal /ACC_DET is connected is disposed next to the contact (first clock contact) TC07 that transmits the clock signal SCLK (first clock signal). In general, noise (clock noise) associated with a potential fluctuation of a clock signal is transmitted to a contact adjacent to the contact of the clock signal, which may cause malfunction. In particular, this influence is significant in a configuration that has many contacts and a short distance between each adjacent contacts as in this embodiment. Accordingly, by disposing the attachment detecting contact TC06 next to the SCLK contact TC07, the influence of the clock noise can be suppressed.

The accessory attachment detecting signal /ACC_DET is pulled up before the accessory 200 is attached, but is set to the GND potential after the accessory 200 is attached. On the other hand, since the SCLK contact TC07 for transmitting the clock signal does not transmit the clock signal and the potential does not fluctuate before the accessory 200 is attached. The potential fluctuates because the clock signal is transmitted only after the accessory 200 is attached.

When the SCLK contact TC07 transmits a clock signal, the attachment detecting contact TC06 is at a GND potential. Therefore, even if the attachment detecting contact TC06 receives clock noise, the potentials of the control circuits of the camera 100 and the accessory 200 are less likely to fluctuate, so that malfunction can be prevented. In addition, the clock noise can be restrained from transmitting to a position farther than the attachment detecting contact TC06. As a result, it is unnecessary to add a GND terminal, and thus the influence of clock noise can be suppressed without increasing the number of contacts.

SCL (second clock signal) as a clock signal is also transmitted to the contact (second clock contact) TC13. However, SCLK transmitted to the SCLK contact TC07 has a higher frequency than a frequency of SCL, and the SCLK contact TC07 generates more clock noise than the SCL contact TC13. Therefore, disposing the attachment detecting contact TC06 next to the SCLK contact TC07 instead of next to the SCL contact TC13 is more effective in preventing malfunction caused by the clock noise.

In addition to the difference in frequency, SCL transmitted by the SCL contact TC13 is a clock signal of an I2C communication standard, and a voltage fluctuation of the signal line is driven by the open-drain connection. On the other hand, SCLK transmitted by the SCLK contact TC07 is a clock signal of an SPI communication standard, and a voltage fluctuation of the signal line is driven by the CMOS output. Therefore, the SCL contact TC13 tends to have a gentler edge of the voltage fluctuation than an edge of the voltage fluctuation of the SCLK contact TC07, and is less likely to generate the clock noise. Hence, disposing the attachment detecting contact TC06 next to the SCLK contact TC07 instead of next to the SCL contact TC13 is more effective in preventing malfunction caused by the clock noise.

The differential signals D1N and D1P may be transmitted in pairs to the first and second differential signal contacts TC19 and TC20 to transmit the clock signal. In that case, a clock signal (third clock signal) having a higher frequency than the frequencies of the clock signals of the SCLK contact TC07 and the SCL contact TC13 may be transmitted. However, the differential signals D1N and D1P are pair signals, and thus the clock noise emission is less than those of the SCLK contact TC07 and the SCL contact TC13 that transmit single-ended signals. Therefore, disposing the attachment detecting contact TC06 next to the SCLK contact TC07 instead of next to the first and second differential signal contacts TC19 and TC20 is more effective to prevent malfunction caused by the clock noise.

The contact (first data contact) TC08 disposed next to the SCLK contact TC07 on the opposite side of the attachment detecting contact TC06 transmits MOSI (first data signal). Since MOSI is a data signal, it appears that MOSI is susceptible to clock noise. However, MOSI is a data signal of the same SPI communication standard as the clock signal transmitted by the SCLK contact TC07, and thus its potential fluctuation timing is synchronized with the clock signal and MOSI is less likely to be affected by the clock noise.

Therefore, the contact TC08 does not have to be fixed to the GND potential and can be used as the MOSI contact.

An accessory connection unit 211 is a connection unit electrically connectable to the camera 100 via 21 contacts TA01 to TA21 that are arranged in a row. The contacts TA01 to TA21 are arranged in this order along their arrangement direction.

The contact TA01 is connected to GND and serves not only as a reference potential contact but also as a contact for controlling wiring impedances of the differential signals DIN and DIP.

The differential signals D1N and D1P communicated via signal lines connected to the contacts TA02 and TA03 are data communication signals and they perform data communication in pairs. The signal lines connected to the contacts TA02 and TA03 are connected to the differential communication circuit 207.

The contact TA04 is connected to the GND and serves as a reference potential contact for the camera 100 and the accessory 200.

A signal line connected to the contact TA05 is connected to the accessory power supply circuit 202 and the charging circuit 204 and is also connected to the accessory power supply VACC generated in the camera 100.

The contact TA06 is connected to the GND. When the accessory 200 is attached to the camera 100, the signal level of the accessory attachment detecting signal /ACC_DET is set to a ground level (GND potential) as a low level (Lo). Thereby, the camera 100 can detect the attachment of the accessory 200.

The signals SCLK, MOSI, MISO, and CS are communicated via signal lines connected to the contacts TA07, TA08, TA09, and TA10, respectively. These signals are signals for performing the SPI communication in which the accessory control circuit 201 serves as a communication slave.

The communication request signal /WAKE for the accessory control circuit 201 to request the camera 100 for communication is communicated via a signal line connected to the contact TA11. The accessory control circuit 201 requests the camera 100 for communication by setting the signal level of the communication request signal /WAKE to the low level.

Power is supplied from the first camera control circuit 101 to the accessory 200 via TA05 in response to detection of the attachment of the accessory 200. Thereafter, the accessory control circuit 201 notifies the first camera control circuit 101 that the power supply has been received by changing the signal level (potential) of the communication request signal /WAKE from the high level to the low level.

The accessory control circuit 201 can notify that there is a factor that causes the accessory 200 to communicate with the camera 100 by changing the signal level (potential) of the communication request signal /WAKE from the high level to the low level even when there is no request from the camera 100. With this configuration, the first camera control circuit 101 can omit an operation of periodically checking, through polling, whether or not the accessory 200 has a factor that requires communication. The accessory 200 can communicate with the camera 100 on a real-time basis when the communication requiring factor occurs.

The signals SDA and SCL for performing the I2C communication in which the accessory control circuit 201 serves as a communication slave are communicated via signal lines connected to the contacts TA12 and TA 13, respectively.

The functional signals FNC1, FNC2, FNC3, and FNC4 whose functions are variable depending on the type of accessory 200 are communicated via signal lines connected to the contacts TA14, TA15, TA16, and TA17. For example, in a case where the accessory 200 is a microphone device, an audio data signal is communicated, and in a case where the accessory 200 is an illumination device (strobe unit), a signal for notifying a light emission timing is communicated.

The contact TA18 is connected to the GND and serves as a reference potential contact for the camera 100 and the accessory 200.

Differential signals D2N and D2P communicated via signal lines connected to the contacts TA19 and TA20, respectively, are data communication signals that perform data communication in pairs. The signal lines connected to the contacts TA19 and TA20 are connected to the external connection terminal 209.

The contact TA21 is connected to the GND and serves not only as a reference potential contact but also as a terminal for controlling the wiring impedances of the differential signals D2N and D2P The contacts TA01, TA04, TA06, TA18, and TA21 are connected to, for example, a GND portion of a flexible printed circuits substrate, and the GND portion of the flexible printed circuits substrate is fixed to a metallic member which serves as a GND level of the accessory 200, with an unillustrated screw or the like. The metallic member serving as the GND level includes, for example, a shoe attachment foot engageable with the accessory shoe portion of the camera 100, an unillustrated base plate inside the accessory 200, and the like.

Figure 6:
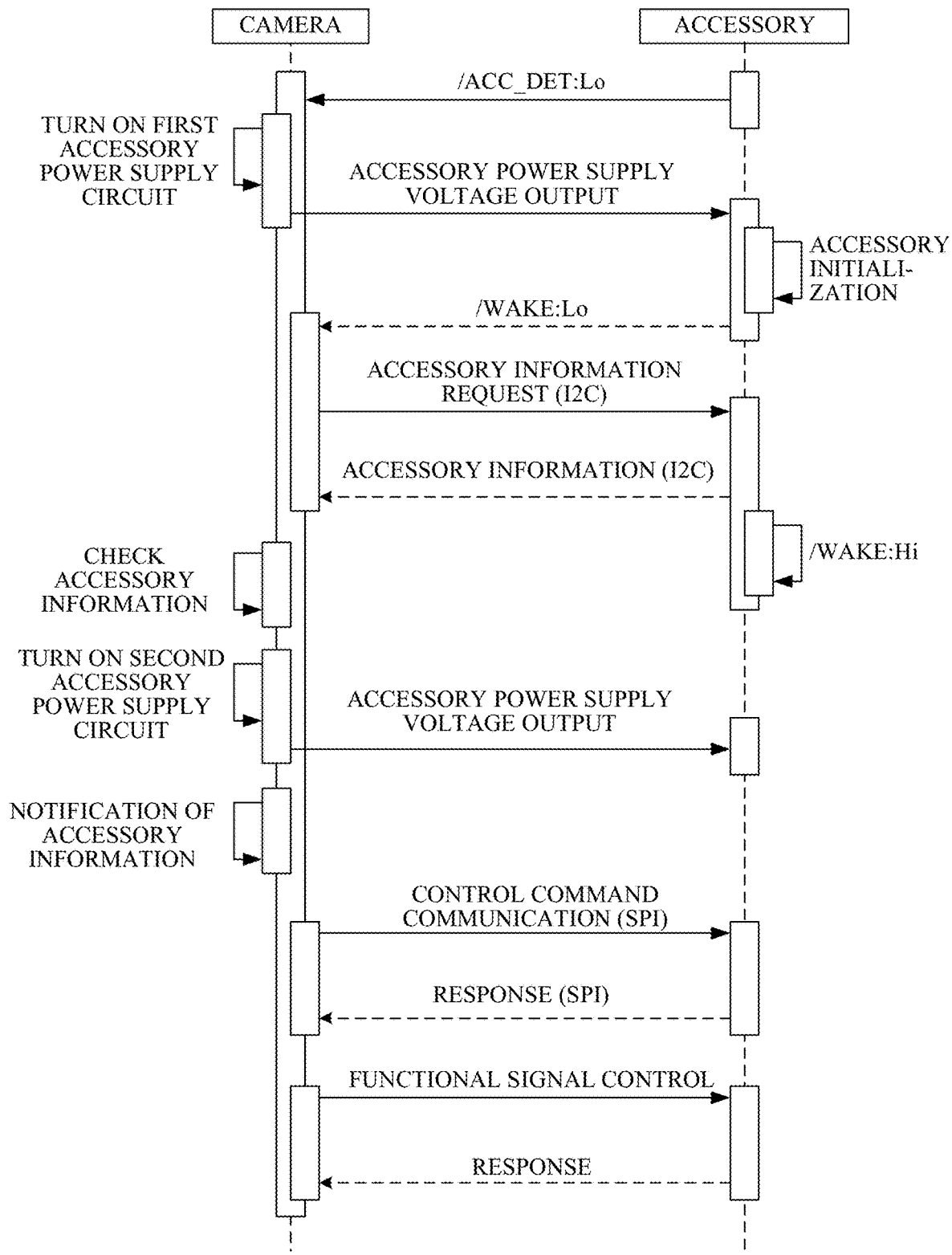
FIG. 6 is a diagram illustrating an example of an operation sequence of a camera and an accessory.

FIG. 6 illustrates an example of an operation sequence to be performed by the camera 100 and the accessory 200 when the accessory 200 is attached to the camera 100.

When the accessory 200 is attached to the camera 100, the signal level of the accessory attachment detecting signal /ACC_DET becomes a GND level, and the first camera control circuit 101 determines that the accessory 200 has been attached.

If the first camera control circuit 101 determines that the accessory 200 has been attached, the first camera control circuit 101 sets a signal level of a power supply control signal CNT_VACC1 to a high level (Hi) in order to turn on the output of the first accessory power supply circuit 131. The first accessory power supply circuit 131 outputs a voltage of the accessory power supply VACC when the signal level of the power supply control signal CNT_VACC1 is set to the high level.

In response to the reception of the voltage of the accessory power supply VACC, the accessory power supply circuit 202 generates the accessory microcomputer power supply VMCU_A for the accessory control circuit 201. Thereby, the accessory control circuit 201 is started. After the start, the accessory control circuit 201 initializes each block in the accessory 200. Thereafter, when the accessory 200 becomes the communicable state with the camera 100, the accessory control circuit 201 sets the signal level of the communication request signal /WAKE to the low level.

The first camera control circuit 101 determines that the accessory 200 is in the communicable state when detecting that the signal level of the communication request signal /WAKE becomes the low level.

The first camera control circuit 101 requests the accessory information by the I2C communication. The accessory control circuit 201 transmits the accessory information in response to reception of the request for the accessory information from the camera 100. After transmitting the accessory information, the accessory control circuit 201 sets the signal level of the communication request signal /WAKE to the high level.

The first camera control circuit 101 checks the received accessory information and determines, for example, whether or not the first camera control circuit 101 can control the attached accessory 200. The first camera control circuit 101 turns on the second accessory power supply circuit 132.

The first camera control circuit 101 makes various settings for the camera 100, and when completing the settings, the first camera control circuit 101 notifies the second camera control circuit 102 of the accessory information.

The second camera control circuit 102 notifies the accessory 200 of a control command, performs control on the functional signals, and the like by the SPI communication, based on the accessory type information indicating the type of the accessory.

FIG. 7 is a diagram illustrating an example of the accessory information that the accessory 200 stores in an unillustrated non-volatile memory (memory). The accessory information is mapped to a memory space at addresses 0x00 to 0x0F. In the I2C communication in this embodiment, a checksum value for read data is added as last data of communication.

D7-D0 data at the address 0x00 is the accessory type information indicating the type of the accessory. FIG. 8 illustrates examples of the accessory type information. For example, 0x81 indicates that the type is a strobe device, 0x82 indicates that the type is an interface conversion adapter device, 0x83 indicates that the type is a microphone device, and 0x84 indicates that the type is a multi-accessory connection adapter device for attaching a plurality of accessory devices to the camera 100. The adapter device is an intermediate accessory attached between the camera 100 and an accessory such as a strobe device and a microphone device. The interface conversion adapter device is an adapter device that converts the interface so as to provide compatibility between the camera 100 and an accessory when an interface of the camera 100 and an interface of the accessory are different. The multi-accessory connection adapter device is an adapter device to which a plurality of accessories are attachable.

D7-D0 data at an address 0x01 is information indicating a model number (identification number) of the accessory 200. A model of the accessory 200 can be identified by this information and the accessory type information described above.

D7-D0 data at an address 0x02 is information indicating a firmware version of the accessory 200.

D7-D6 data at an address 0x03 is information indicating whether or not voltage supply of the accessory power supply VACC to the accessory 200 is to be requested when an unillustrated power supply switch of the camera 100 is turned off. In a case where the information is 0, it is indicated that no power supply is to be requested. In a case where the information is 1, it is indicated that a power supply from the first accessory power supply circuit 131 is to be requested. In a case where the information is 2, it is indicated that a power supply from the second accessory power supply circuit 132 is to be requested.

D5-D4 data at the address 0x03 is information indicating whether or not voltage supply of the accessory power supply VACC to the accessory 200 is to be requested when the camera 100 is in a power-saving mode state. In a case where the information is 0, it is indicated that no power supply is to be requested. In a case where the information is 1, it is indicated that a power supply from the first accessory power supply circuit 131 is to be requested. In a case where the information is 2, it is indicated that a power supply from the second accessory power supply circuit 132 is to be requested.

D3-D2 data at the address 0x03 is information indicating whether or not the accessory 200 has the battery 205. In a case where the information is 0, it is indicated that the accessory 200 has no battery 205, and in a case where the information is 1, it is indicated that the accessory 200 has the battery 205.

D1-D0 data at the address 0x03 is information indicating whether or not the accessory 200 has a charging function for the battery 205. In a case where the information is 0, it is indicated that the accessory 200 has no charging function, and in a case where it is 1, it is indicated that the accessory 200 has the charging function.

D7-D0 data at an address 0x04 is information indicating requested current of the accessory power supply VACC with which power is supplied from the camera 100 to the accessory 200. For example, a value obtained by multiplying this information by 10 indicates a current value. In a case where the information indicating the requested current is 10, it is indicated that 100 mA is requested, and in a case where the information indicating the requested current is 100, it is indicated that 1 A is requested. In order to reduce an information amount, the information indicating the requested current may be information associated with a current value. For example, in a case where the information indicating the requested current is 0, it may be indicated that 100 mA is requested, in a case where the information indicating the requested current is 1, it may be indicated that 300 mA is requested, in a case where the information indicating the requested current is 3, it may be indicated that 450 mA is requested, and in a case where the information indicating the requested current is 4, it may be indicated that 600 mA is requested.

D7 data at an address 0x05 is information indicating whether or not the accessory 200 is in a firmware update mode state. In a case where the information is 0, it is indicated that the accessory 200 is not in the firmware update mode state, and in the case where the information is 1, it is indicated that the accessory 200 is in the firmware update mode state.

D6 data at the address 0x05 is information indicating whether or not the accessory 200 has a firmware update function. In a case where the information is 0, it is indicated that the accessory 200 does not have the function. In the case where the information is 1, it is indicated that the accessory 200 has the function.

D5-D4 data at the address 0x05 is information indicating whether or not an operation of the accessory 200 that is attached to an intermediate connection accessory is to be permitted. In a case where the information is 0, it is indicated that the operation is not to be permitted, and in a case where the information is 1, it is indicated that the operation is to be permitted.

D3-D2 data at the address 0x05 is information indicating whether or not the accessory 200 needs to confirm an attachment state of an intermediate connection accessory when the camera 100 is started. In a case where the information is 0, it is indicated that the confirmation is unnecessary, and in a case where the information is 1, it is indicated that the confirmation is necessary.

D1-D0 data at the address 0x05 is information indicating whether or not the accessory 200 supports a command notification by the I2C communication. In a case where the information is 0, it is indicated that the command notification is not supported, and in a case where the information is 1, it is indicated that the command notification is supported.

D5-D4 data at an address 0x06 is information indicating a communication method with which the camera 100 can be notified of a factor of a communication request after the accessory 200 notifies the camera 100 of communication request signal /WAKE. In a case where the information is 0, it is indicated that the I2C communication is supported. In a case where the information is 1, it is indicated that the SPI communication is supported. In a case where the information is 2, it is indicated that both the I2C communication and the SPI communication are supported.

D3-D0 data at the address 0x06 is information indicating whether or not the accessory 200 has functions of the signals FNC1, FNC2, FNC3, and FNC4, respectively. In a case where the information is 0, it is indicated that the accessory 200 does not have that function. In a case where the information is 1, it is indicated that the accessory 200 has that function.

D7 data at an address 0x0A is information indicating whether or not the accessory 200 is to request the camera 100 for a start when the accessory 200 notifies the camera 100 of the communication request signal /WAKE. In a case where the information is 0, it is indicated that the start is to be requested, and in a case where the information is 1, it is indicated that the start is not to be requested.

D6-D0 data at the address 0x0A is information indicating a generating factor of the communication request signal /WAKE of which the accessory 200 notifies the camera 100. FIG. 9 illustrates examples of generating factors of the communication request signal /WAKE. In FIG. 9, the examples are illustrated in a case where the accessory 200 is a microphone device. For example, a factor number 0x00 is a number indicating that a menu invocation unit in the operation unit 212 has been operated. A factor number 0x01 is a number indicating that the accessory 200 has completed an output control of an audio signal. A factor number 0x02 is a number indicating that the accessory 200 has completed mute processing of an audio signal.

D1 data at an address 0x0C is information indicating an SPI communication protocol supported by the accessory 200. In a case where the information is 0, it is indicated that the accessory 200 supports the SPI protocol A, and in a case where the information is 1, it is indicated that the accessory 200 supports the SPI protocol B.

D0 data at the address 0x0C is information indicating a control logic for the signal CS in the SPI communication supported by the accessory 200. In a case where the information is 0, it is indicated that the signal CS is a low-active logic, and in a case where the information is 1, it is indicated that the signal CS is a high-active logic.

D7-D0 data at an address 0x0D is information indicating a communication interval between bytes in a case where the accessory 200 performs communication in accordance with the SPI protocol A and the D7 data at the address 0x05 is 0.

D7-D0 data at an address 0x0E is information indicating a communication interval between bytes in a case where the accessory 200 performs communication in accordance with the SPI protocol A and the D7 data at the address 0x05 is 1.

FIGS. 10A and 10B are diagrams illustrating examples of the communication intervals between bytes. FIG. 10A illustrates the communication intervals for the data at the address 0x0D, and FIG. 10B illustrates the communication intervals for the data at the address 0x0E.

D7-D0 data at an address 0x0F is information indicating a checksum.

Figure 11:
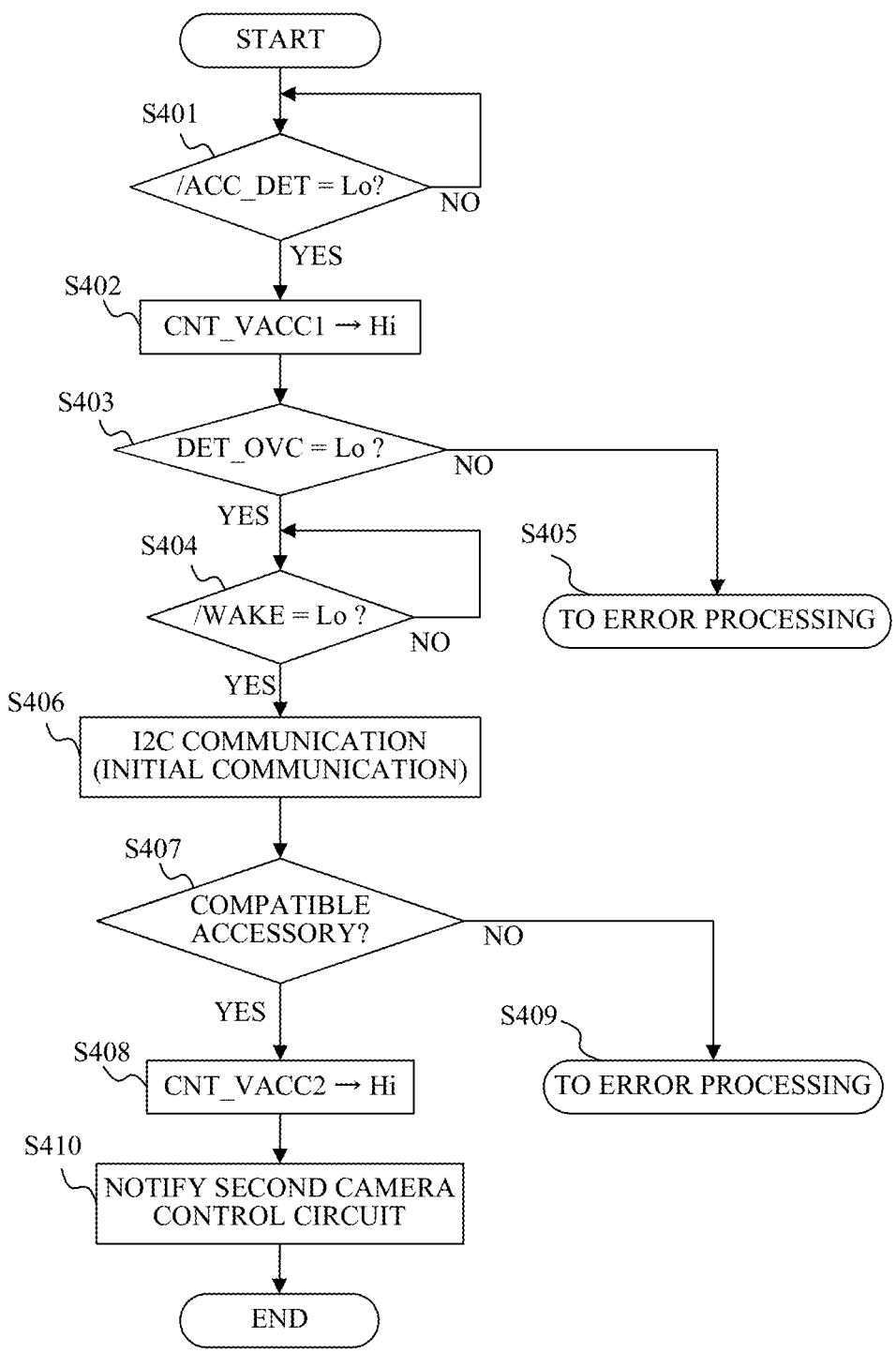
FIG. 11 is a flowchart illustrating processing to be performed by a first camera control circuit.

FIG. 11 is a flowchart illustrating processing to be executed by the first camera control circuit 101 from when the accessory 200 is attached to the camera 100 to when functions of the accessory 200 are enabled.

In step S401, the first camera control circuit 101 determines whether or not the accessory 200 is attached by determining whether or not the signal level of the accessory attachment detecting signal /ACC_DET is the low level. If the signal level is the low level and the it is determined that the accessory 200 is attached, the flow proceeds to S402. If the signal level is a high level (Hi) and it is determined that the accessory is not attached, and the processing of this step is repeated.

In step S402, the first camera control circuit 101 sets the signal level of the power supply control signal CNT_VACC1 to the high level in order to turn on the output of the first accessory power supply circuit 131. The first accessory power supply circuit 131 outputs a voltage of the accessory power supply VACC when the signal level of the power supply control signal CNT_VACC1 is set to the high level.

In step S403, the first camera control circuit 101 determines whether or not an overcurrent is flowing by determining whether or not the signal level of the overcurrent detecting signal DET_OVC is the low level. If the overcurrent signal level is the low level and it is determined that no overcurrent is flowing, the flow proceeds to S404, and if the signal level is the high level and it is determined that the overcurrent is flowing, the flow proceeds to step S405.

In step S404, the first camera control circuit 101 determines whether or not the initialization of the accessory 200 has been completed by determining whether or not the signal level of the communication request signal /WAKE from the accessory 200 is the low level. If the signal level is the low level and it is determined that the initialization has been completed, the flow proceeds to step S406. If the signal level is the high level and it is determined that the initialization has not yet been completed, the processing of this step is repeated.

In step S405, the first camera control circuit 101 performs error processing.

In step S406, the first camera control circuit 101 performs the I2C communication (initial communication) with the accessory 200 and reads 15-byte accessory information.

In step S407, the first camera control circuit 101 determines whether or not the attached accessory 200 is a device compatible with the camera 100 based on the accessory information read in S406. If it is determined that the attached accessory 200 is compatible with the camera 100, the flow proceeds to S408, and if not, the flow proceeds to step S409.

In step S408, the first camera control circuit 101 sets the signal level of the power supply control signal CNT_VACC2 to the high level in order to turn on the output of the second accessory power supply circuit 132. The second accessory power supply circuit 132 outputs a voltage of the accessory power supply VACC when the signal level of the power supply control signal CNT_VACC2 is set to the high level. In this embodiment, if both the signal levels of the power supply control signals CNT_VACC1 and CNT_VACC2 are set to the high levels, the second accessory power supply circuit 132 outputs the voltage of the accessory power supply VACC.

In step S410, the first camera control circuit 101 notifies the second camera control circuit 102 of the accessory information read in step S406.

Figure 12:
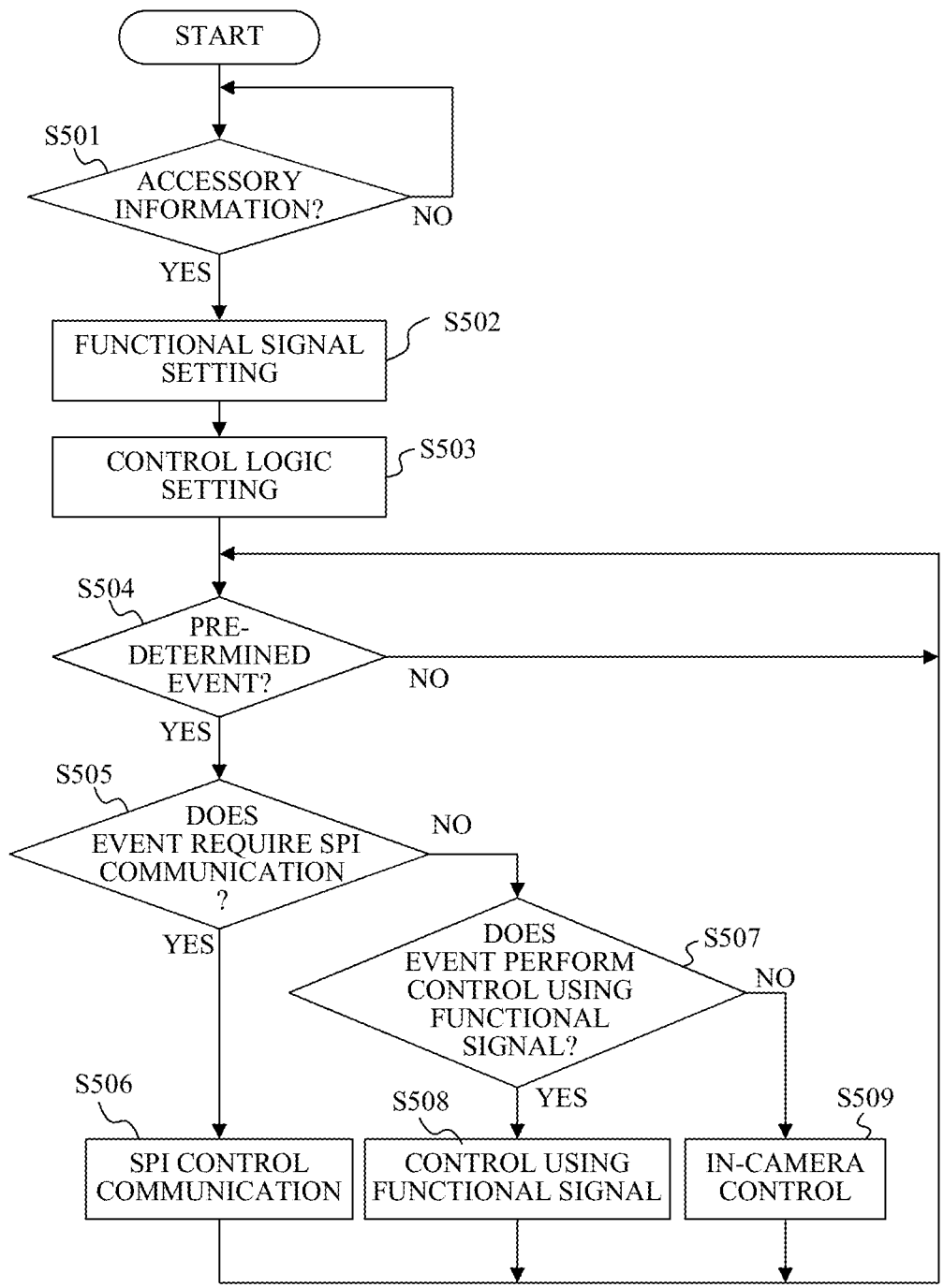
FIG. 12 is a flowchart illustrating processing to be performed by the second camera control circuit.

FIG. 12 is a flowchart illustrating processing to be executed by the second camera control circuit 102 from when the accessory 200 is attached to the camera 100 to when the functions of the accessory 200 are enabled.

In step S501, the second camera control circuit 102 determines whether or not the accessory information has been notified from the first camera control circuit 101. If it is determined that the accessory information has been notified, the flow proceeds to step S502, and if not, the processing of this step is repeated.

In step S502, the second camera control circuit 102 sets the functional signals FNC1 to FNC4 based on the accessory information. For example, in a case where it is notified that the accessory 200 is a microphone device, the functional signals FNC1 to FNC3 are set to function as an audio data clock signal BCLK, an audio data channel signal LRCLK, and an audio data signal SDATA, respectively. In a case where it is notified that the accessory 200 is a strobe device, the functional signal FNC 4 is set to function as a strobe light emission synchronization signal XOUT. For functional signals that do not require control over the accessory 200, predetermined settings are made such that the operation of the camera 100 and the accessory 200 are not interfered.

In step S503, the second camera control circuit 102 sets the control logic for the signal CS in the SPI communication based on the accessory information.

In step S504, the second camera control circuit 102 determines whether or not a predetermined event for the accessory 200 has occurred. If it is determined that the predetermined event has occurred, the flow proceeds to step S505, and if not, the processing of this step is repeated.

In step S505, the second camera control circuit 102 determines whether the predetermined event for the accessory 200 is an event that requires the SPI communication with the accessory 200. If it is determined that the predetermined event requires the SPI communication, the flow proceeds to step S506, and if not, the flow proceeds to step S507.

In step S506, the second camera control circuit 102 performs the SPI communication with the accessory 200. For example, in a case where the accessory 200 is a microphone device, the SPI communication includes instruction communication for turning on a microphone operation, instruction communication for turning off the microphone operation, instruction communication for switching a sound collection directivity of the microphone, instruction communication for switching an equalizer function of the microphone, and the like. In a case where the accessory 200 is a strobe device, the SPI communication includes communication for reading setting information on the strobe, communication for notifying the strobe of the setting information, and the like. After the processing of this step is completed, the flow returns to S504.

In step S507, the second camera control circuit 102 determines whether or not the predetermined event for the accessory 200 is an event that performs control using the functional signal. If it is determined that the event performs the control using the functional signal, the flow proceeds to S508, and if not, the flow proceeds to S509.

In step S508, the second camera control circuit 102 performs the control on the accessory 200 using the functional signal. For example, in a case where the accessory 200 is a microphone device, the control using the functional signal is starting output of the audio data clock signal BCLK and the audio data channel signal LRCLK and input of the audio data signal SDATA. Thereby, the camera 100 can acquire audio data from the accessory 200. In a case where the accessory 200 is a strobe device, the control using the functional signal is notification of the strobe light emission synchronization signal XOUT at a predetermined timing. Thereby, the camera 100 notify the strobe of a light emission instruction. After the processing of this step is completed, the flow returns to S504.

In step S509, the second camera control circuit 102 performs in-camera control according to the predetermined event for the accessory 200. For example, in a case where the accessory 200 is a microphone device, the in-camera control includes control for starting or ending recording of audio data in the recording memory 126, control for performing equalizer processing on the audio data, and the like. In a case where the accessory 200 is a strobe device, the in-camera control includes photometric control in which the image sensor 122 accumulates and acquires light emitted by the strobe, control for calculating an indicated value of a light emission amount of the strobe, and the like. After the processing of this step is completed, the flow returns to step S504.

As described above, according to the flows of FIGS. 11 and 12, the camera 100 can perform control on the accessory 200 that has been attached to the camera 100.

Figure 13:
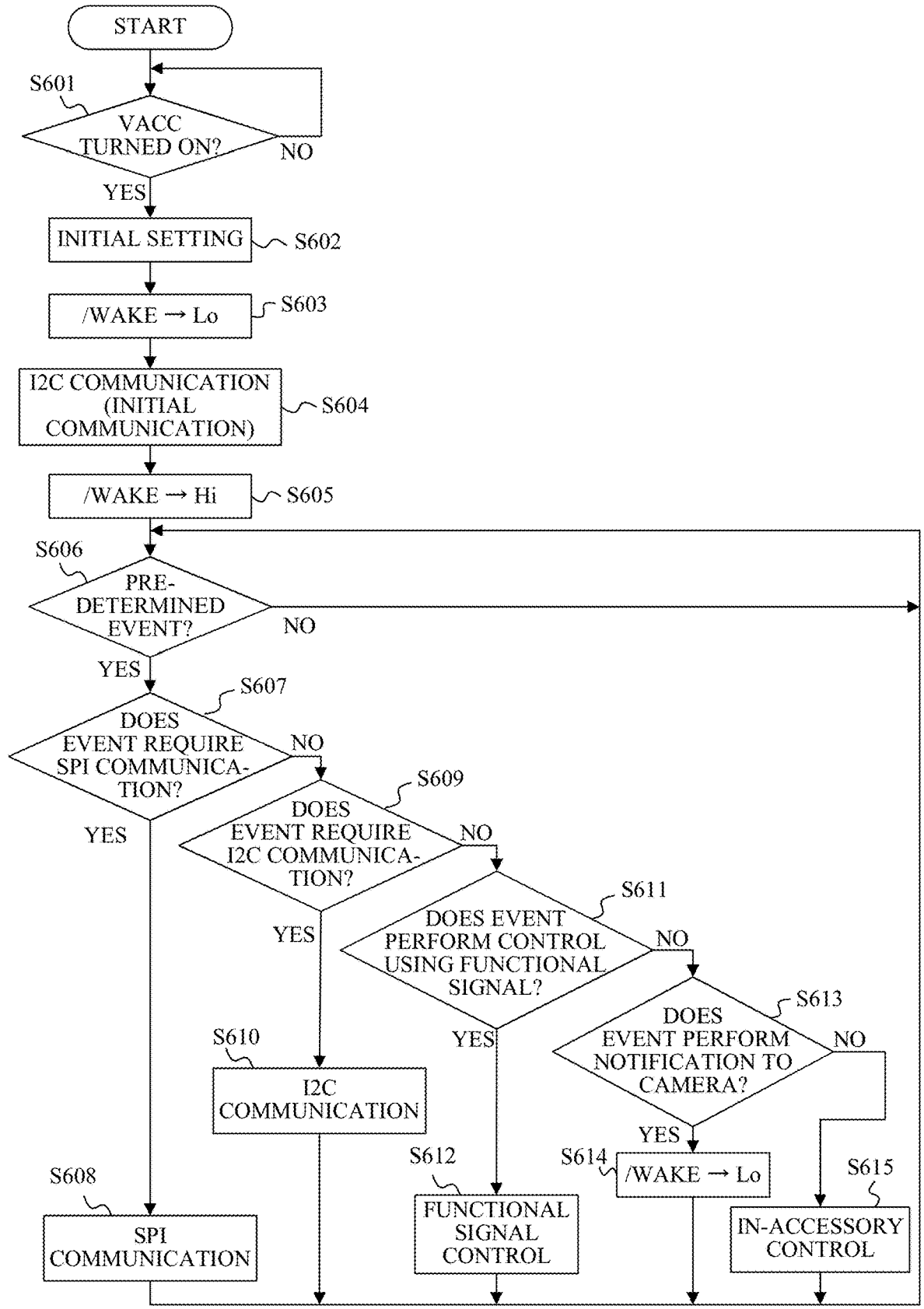
FIG. 13 is a flowchart illustrating processing to be performed by the accessory.

FIG. 13 is a flow chart illustrating processing to be performed by the accessory control circuit 201 from when the accessory 200 is attached to the camera 100 to when the functions of the accessory 200 are operated.

In step S601, the accessory control circuit 201 determines whether or not the accessory power supply VACC is turned on. If it is determined that the accessory power supply VACC is turned on, the flow proceeds to step S601, and if not, the processing of this step is repeated. In a case where the accessory 200 has no battery 205, the accessory control circuit 201 determines that the accessory power supply VACC is turned on if the operation of the accessory control circuit 201 itself is started. In a case where the accessory 200 has the battery 205, the accessory control circuit 201 may monitor the voltage value of the accessory power supply VACC to determine whether or not the accessory power supply VACC is turned on.

In step S602, the accessory control circuit 201 makes a predetermined initial setting. The predetermined initial setting is, for example, setting of an operating frequency of the microcomputer, setting of an input/output control port of the microcomputer, setting of initialization of a timer function of the microcomputer, setting of initialization of an interrupt function of the microcomputer, and the like.

In step S603, the accessory control circuit 201 sets the signal level of the communication request signal /WAKE to the low level so as to notify the camera 100 that the initial setting has been completed.

In step S604, the accessory control circuit 201 responds to the I2C communication from the camera 100 and transmits 15-byte accessory information to the camera 100.

In step S605, the accessory control circuit 201 sets the signal level of the communication request signal /WAKE to the high level.

In step S606, the accessory control circuit 201 determines whether or not the predetermined event for the accessory 200 has occurred. If it is determined that the predetermined event has occurred, the flow proceeds to step S607, and if not, the processing of this step is repeated.

In step S607, the accessory control circuit 201 determines whether or not the predetermined event for the accessory 200 is an event that requires the SPI communication with the camera 100. If it is determined that the event requires the SPI communication, the flow proceeds to S608, and if not, and the flow proceeds to step S609.

In step S608, the accessory control circuit 201 performs the SPI communication with the camera 100. If the signal level of the communication request signal /WAKE is the low level when the accessory control circuit 201 executes the SPI communication, the accessory control circuit 201 sets the signal level of the communication request signal /WAKE to the high level after the SPI communication. For example, in a case where the accessory 200 is a microphone device, the SPI communication includes instruction communication for turning on a microphone operation, instruction communication for turning off the microphone operation, instruction communication for switching a sound collection directivity of the microphone, instruction communication for switching an equalizer function of the microphone, and the like. In a case where the accessory 200 is a strobe device, the SPI communication includes communication for reading setting information on the strobe, communication for notifying the strobe of the setting information, and the like. After the processing of this step is completed, the flow returns to S606.

In step S609, the accessory control circuit 201 determines whether or not the predetermined event for the accessory 200 is an event that requires the I2C communication with the camera 100. If it is determined that the event requires the I2C communication, the flow proceeds to step S610, and if not, the flow proceeds to step S611.

In step S610, the accessory control circuit 201 performs the I2C communication with the camera 100. The I2C communication includes, for example, communication for reading the generating factor of the communication request signal /WAKE of which the accessory control circuit 201 has notified the camera 100. After the processing of this step is completed, the flow returns to step S606.

In step S611, the accessory control circuit 201 determines whether or not the predetermined event for the accessory 200 is an event that performs control using a functional signal. If it is determined that the event performs the control using the functional signal, the flow proceeds to step S612, and if not, the flow proceeds to step S613.

In step S612, the accessory control circuit 201 performs control on the camera 100 using the functional signal. For example, in a case where the accessory 200 is a microphone device, the control using the functional signal includes reception control of the audio data clock signal BCLK and the audio data channel signal LRCLK and output control of the audio data signal SDATA in synchronization with the audio data clock signal BCLK and the audio data channel signal LRCLK. In a case where the accessory 200 is a strobe device, the control using the functional signals includes reception control of the strobe light emission synchronization signal XOUT. After the processing of this step is completed, the flow returns to step S606.

In step S613, the accessory control circuit 201 determines whether or not the predetermined event for the accessory 200 is an event that performs a notification to the camera 100 by the communication request signal /WAKE. If it is determined that the event performs the notification to the camera 100 by the communication request signal /WAKE, the flow proceeds to step S614, and if not, the flow proceeds to step S615.

In step S614, the accessory control circuit 201 stores a factor number of the communication request signal /WAKE to the camera 100 corresponding to the predetermined event for the accessory 200 in an unillustrated volatile memory of the accessory 200. Thereafter, the accessory control circuit 201 sets the signal level of the communication request signal /WAKE to the low level. After the processing of this step is completed, the flow returns to step S606.

In step S615, the accessory control circuit 201 performs in-accessory control according to the predetermined event for the accessory 200. The in-accessory control includes for example, detecting control of a remaining battery level in a case where the accessory 200 has the battery 205, detecting control on the operation unit 212, and the like. After the processing of this step is completed, the flow returns to step S606.

As described above, according to the flow of FIG. 14, the accessory 200 can perform the functional operation after the accessory 200 is attached to the camera 100.

First Embodiment

In this embodiment, a description will be given of a menu invocation operation of the accessory 200 having a menu invocation unit for requesting to cause the display 127 of the camera 100 to display a menu screen (menu image) of an attached accessory. In this embodiment, the menu invocation unit is a push switch. The menu invocation unit may be a physical member or may be at least a part of an area of an unillustrated display provided on the accessory 200 (accessory-side display).

First, a description will be given of, as an example of a case where the setting information is stored in the accessory 200, a case where the accessory 200 is a strobe transmitter that performs radio wave wireless control on a strobe. The operation unit 212 only includes a menu invocation unit.

The accessory control circuit 201 performs the processing from when the accessory 200 is attached to the camera 100 to when the functions of the accessory 200 operates, according to the flow of FIG. 13.

In step S604, the accessory control circuit 201 responds to the I2C communication from the camera 100 and transmits 15-byte accessory information. In this embodiment, since the accessory 200 is the strobe transmitter, the accessory type information is 0x80 in FIG. 8.

In response to an operation on the menu invocation unit, the accessory control circuit 201 stores in step S614 the factor number (0x00 corresponding to the "menu invocation unit operation" in FIG. 9) of the communication request signal /WAKE to the camera 100 in the volatile memory of the accessory 200. Then, the accessory control circuit 201 sets the signal level of the communication request signal /WAKE to the low level. After the processing of this step is completed, the flow returns to step S606.

The accessory control circuit 201 determines in step S606 and step S607 that the predetermined event is an event that requires the SPI communication for reading strobe transmitter settings and performs communication for reading the strobe transmitter settings. At that time, the accessory 200 transmits the setting information on the strobe transmitter (strobe transmitter setting information) stored in the accessory control circuit 201 to the camera 100.

The camera 100 displays a strobe transmitter setting screen (setting image related to the strobe transmitter) on the display 127 using the received strobe transmitter setting information. The strobe transmitter setting screen is a screen on which setting for main functions of the strobe transmitter is made. FIG. 14A is a diagram illustrating examples of the strobe transmitter setting information. The information includes information on mode, wireless, SYNC, FEB, light emission amount, light control amount, light emission, CH, RATIO, Gr, and the like. A GrA mode, a GrA light emission amount/light control amount, and the like are set values in a mode Gr. In the address 0x0D, custom setting information on the strobe transmitter is stored in addition to the strobe transmitter setting information. Series information and hierarchy information stored in the addresses 0x0E and 0xF are described in the other embodiment.

Figure 15A:
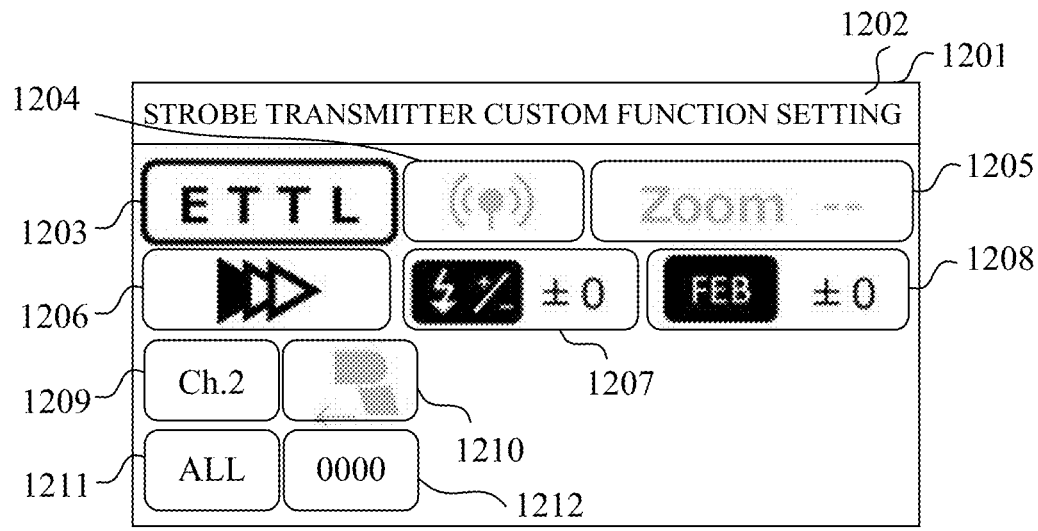
FIGS. 15A to 15C are diagrams illustrating examples of setting screens of the strobe transmitter according to a first embodiment.

FIG. 15A illustrates an example of the strobe transmitter setting screen. Table 1 illustrates an example of a layer structure of the strobe transmitter setting screen.

TABLE 1

| FIRST LAYER | SECOND LAYER | THIRD LAYER | FOURTH LAYER |
|---|---|---|---|
| MODE | ETTL | NON | NON |
|  | M |  |  |
|  | MULTI |  |  |
|  | Gr |  |  |
| WIRELESS | RADIO WAVE TRANSMITTER | NON | NON |
| SYNC | FRONT CURTAIN | NON | NON |
|  | REAR CURTAIN |  |  |
|  | HIGH SPEED |  |  |
| LIGHT EMISSION AMOUNT | 1/1 | NON | NON |
|  | 1/2 |  |  |
|  | 1/4 |  |  |
|  | 1/8 |  |  |
|  | 1/16 |  |  |
|  | 1/32 |  |  |
|  | 1/64 |  |  |
|  | 1/128 |  |  |
|  | 1/256 |  |  |
|  | 1/512 |  |  |
|  | 1/1024 |  |  |
|  | 1/2048 |  |  |
|  | 1/4096 |  |  |
|  | 1/8192 |  |  |
| LIGHT CONTROL AMOUNT | −3 | NON | NON |
|  | −2 |  |  |
|  | −1 |  |  |
|  | ±0 |  |  |
|  | +1 |  |  |
|  | +2 |  |  |
|  | +3 |  |  |
| FEB | ±0 | NON | NON |
|  | ±1 |  |  |
|  | ±2 |  |  |
|  | ±3 |  |  |
| CH | AUTO | NON | NON |
|  | 1 |  |  |
|  | 2 |  |  |
|  | 3 |  |  |
|  | 4 |  |  |
|  | 5 |  |  |
|  | 6 |  |  |
|  | 7 |  |  |
|  | 8 |  |  |
|  | 9 |  |  |
|  | 10 |  |  |
|  | 11 |  |  |
|  | 12 |  |  |
|  | 13 |  |  |
|  | 14 |  |  |
|  | 15 |  |  |
| ID | 0 0 0 0 | NON | NON |
|  | 9 9 9 9 |  |  |
| RATIO | ALL | NON | NON |
|  | A:B |  |  |
|  | A:B C/A:B:C |  |  |
| Gr | A | MODE | ETTL |
|  | B |  | M |
|  | C |  | Ext. M |
|  | D |  | OFF |
|  | E | LIGHT EMISSION AMOUNT/LIGHT CONTROL AMOUNT | M, 1/1 |
|  |  |  | Ext. M 1/2 |
|  |  |  | 1/4 |
|  |  |  | 1/8 |
|  |  |  | 1/16 |
|  |  |  | 1/32 |
|  |  |  | 1/64 |

TABLE 1-continued

| FIRST LAYER | SECOND LAYER | THIRD LAYER | FOURTH LAYER |
|---|---|---|---|
|  |  |  | 1/128 |
|  |  |  | 1/256 |
|  |  |  | 1/512 |
|  |  |  | 1/1024 |
|  |  |  | 1/2048 |
|  |  |  | 1/4096 |
|  |  |  | 1/8192 |
|  |  | ETTL | −3 |
|  |  |  | −2 |
|  |  |  | −1 |
|  |  |  | ±0 |
|  |  |  | +1 |
|  |  |  | +2 |
|  |  |  | +3 |
|  |  | OFF | NON |

Figure 15B:
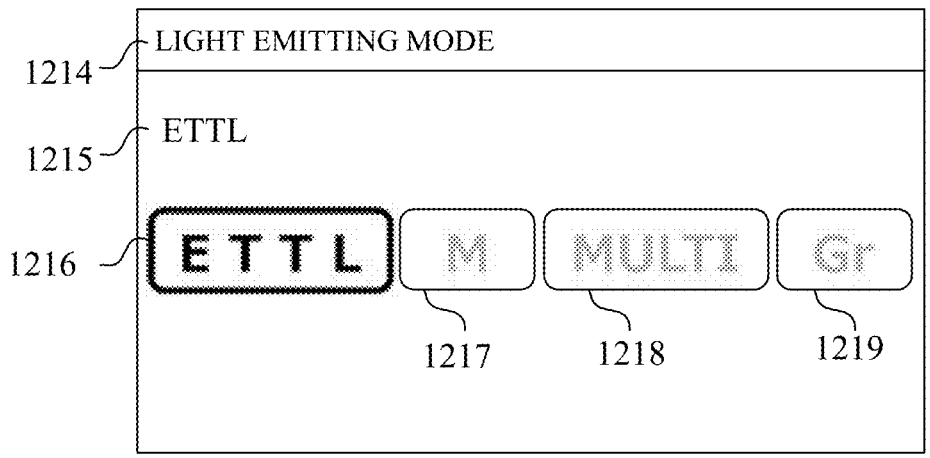

A reference numeral 1201 denotes a display frame of the display 127. A reference numeral 1202 denotes a screen title and indicates that the screen is for setting the functions of the strobe transmitter. A display area below the title is divided for each setting item. An item to be changed can be determined by operating an operation unit (not illustrated) of the camera 100 to move a cursor and pressing a SET button of the operation unit (not illustrated) at a desired cursor position. A reference numeral 1203 denotes an area indicating a light emission mode of the strobe, and in FIG. 15A, ETTL is indicated that is one of light emission modes. The area 1203 is surrounded by a thicker line than lines surrounding the other items because the cursor is placed on the area 1203. As illustrated in FIG. 15B, the emission modes include manual (M), multi light emission (MULTI), and group emission (Gr) in addition to ETTL.

A reference numeral 1204 denotes an area indicating a wireless setting, and is displayed in gray because the wireless setting includes only a radio wave wireless transmitter and cannot be changed in the strobe transmitter in this embodiment. A reference numeral 1205 denotes an area indicating a strobe zoom position used by a strobe having a light emitting portion capable of zoom driving, and is displayed in gray because the strobe transmitter in this embodiment does not have a light emitting portion. A reference numeral 1206 denotes an area indicating a synchronization setting and indicates front curtain synchronization, rear curtain synchronization, high speed synchronization, or the like. A reference numeral 1207 is an area indicating a light control amount. A reference numeral 1208 denotes an area indicating FEB for changing the light control amount for each frame. A reference numeral 1209 denotes an area indicating a radio wave wireless channel setting. A reference numeral 1210 denotes an area indicating a setting on whether or not to emit light from a sender strobe, and is displayed in gray because the setting cannot be changed in the strobe transmitter of this embodiment. A reference numeral 1211 denotes an area indicating a RATIO setting, and ALL, A: B, or A: B C can be selected when the mode is ETTL. A reference numeral 1212 denotes an area indicating an ID of the radio wave wireless that is used for preventing a malfunction caused by interference with another user.

If the SET button is pressed with the cursor placed on the area 1203 as illustrated in FIG. 15A, the display 127 displays a second layer screen of the light emitting mode illustrated in FIG. 15B. A reference numeral 1214 denotes a screen title and indicates that a screen on which items of the light emitting mode is displayed. A reference numeral 1215 denotes an area indicating the current setting. Reference numerals 1216 to 1219 denote areas indicating choices. A thick line surrounding the area 1216 indicates the cursor position. The area 1216 is displayed in black and the areas 1217 to 1219 are displayed in gray, indicating that the current setting is ETTL.

Figure 15C:
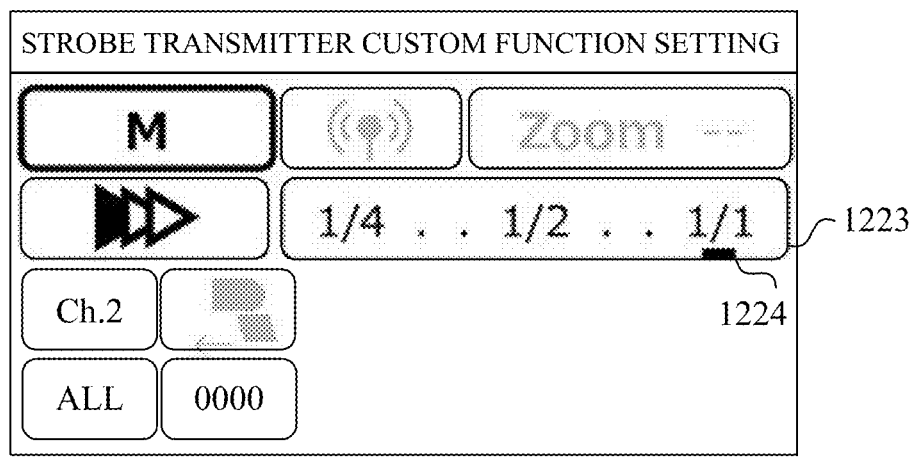

If the operation unit of the camera 100 is operated, the cursor is moved to the manual (M) in the area 1217, and the SET button is pressed, the camera 100 transmits communication for changing the setting to the strobe transmitter. In response to this, the strobe transmitter transmits information on the light emission amount, and the camera 100 causes the display 127 to display the screen illustrated in FIG. 15C. In the setting screen of FIG. 15C, the areas 1207 and 1208 of FIG. 15A disappear. A reference numeral 1223 denotes an area indicating the light emission amount. A reference numeral 1224 denotes a display indicating the current set value.

Next, as an example of a case where the setting information is not stored in the accessory 200, a case will be described where the accessory 200 is a microphone. The operation unit 212 includes only the menu invocation unit.

The accessory control circuit 201 performs processing from when the accessory 200 is attached to the camera 100 to when the function of the accessory 200 operates, according to the flow of FIG. 13.

In step S604, the accessory control circuit 201 responds to the I2C communication from the camera 100 and transmits 15-byte accessory information. Since the accessory 200 is the microphone in this embodiment, the accessory type information is 0x83 in FIG. 8.

If the menu invocation unit is operated, the accessory control circuit 201 stores in step S614 the factor number (0x00 corresponding to the "menu invocation unit operation" in FIG. 9) of the communication request signal /WAKE to the camera 100 in the volatile memory of the accessory 200. After that, the accessory control circuit 201 sets the signal level of the communication request signal /WAKE to the low level. After the processing of this step is completed, the flow returns to step S606.

The camera 100 stores microphone settings, and therefore the camera 100 displays a microphone setting screen on the display 127 without performing the SPI communication.

As described above, if the accessory information is transmitted to the camera and the menu invocation unit is operated, information is stored on the accessory, the information indicating that the generating factor of the communication request signal /WAKE is that the menu invocation unit has been operated. As a result, a desired setting screen can be displayed on the display 127 by simply operating the menu invocation unit instead of operating the camera 100 for searching for the setting screen corresponding to the accessory 200. Further, as described above, even in a case where the accessory 200 stores the setting information, the desired setting screen can be easily displayed on the display 127 by performing the SPI communication.

Second Embodiment

In this embodiment, a case where there are a plurality of screens to be displayed will be described. Strobe transmitter setting screens that can be displayed on the camera 100 are a "strobe transmitter setting screen" and a "strobe transmitter custom setting screen". The two setting screens are not associated with each other as a layer structure, and thus it is not possible to change the settings by entering the "strobe transmitter setting screen" and then moving to the "strobe transmitter custom setting screen".

Figure 16A:
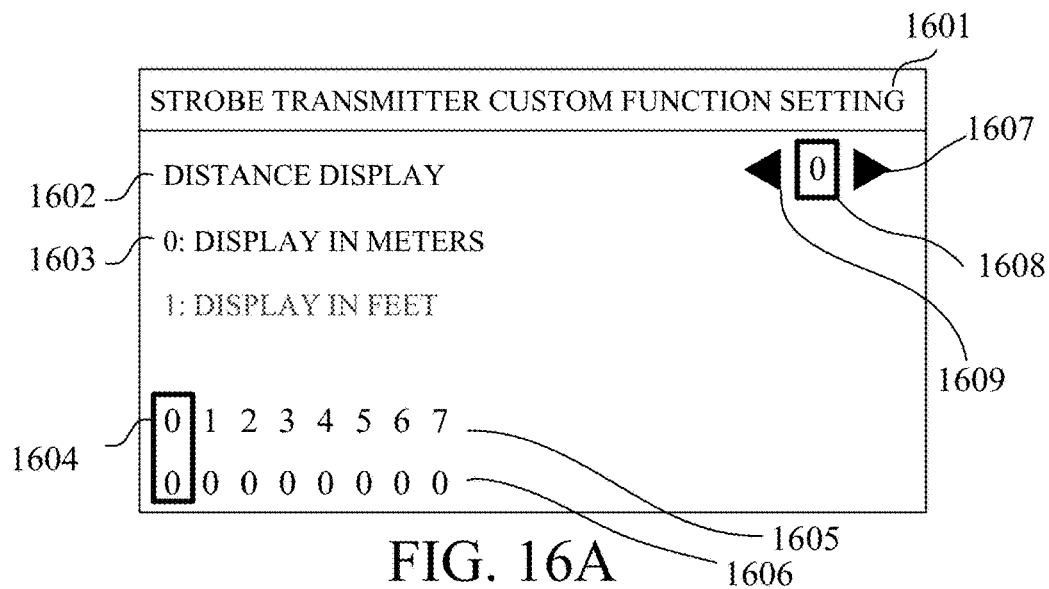
FIGS. 16A to 16C are diagrams illustrating examples of custom setting screens of a strobe transmitter according to a second embodiment.

First, a description will be given of the strobe transmitter custom setting screen. FIG. 16A illustrates an example of the strobe transmitter custom setting screen. FIG. 17 is a diagram illustrating an example of a layer structure of the strobe transmitter custom setting screen. On the custom setting screen, it is possible to perform setting on parts different from main functions of the strobe transmitter, such as auto-power off setting. In this embodiment, the custom setting screen only has two layers, and the settings have two choices of 0 and 1.

Figure 16B:
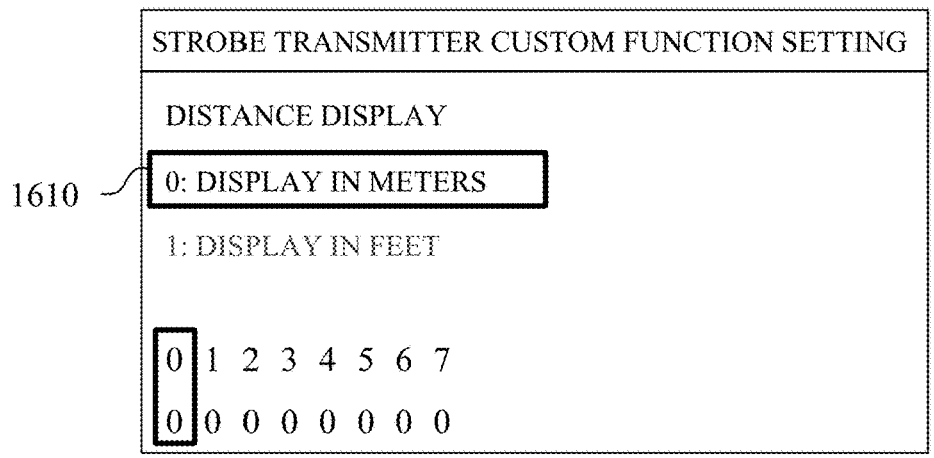
Figure 16C:
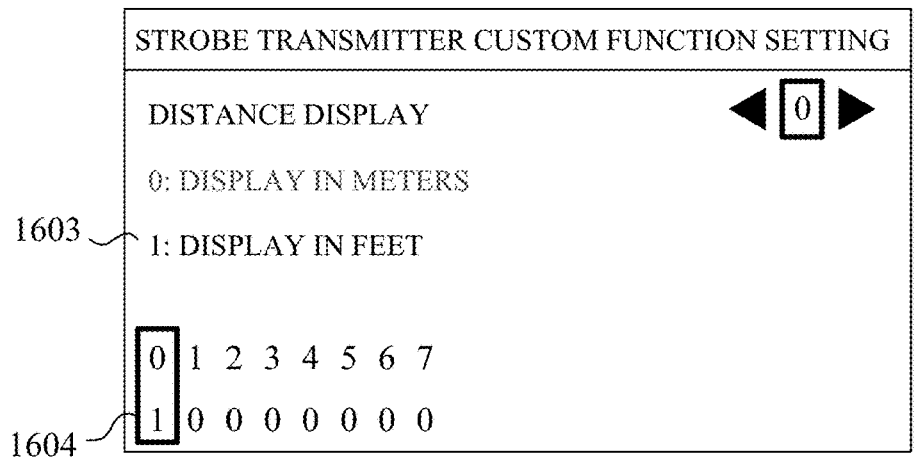

A reference numeral 1601 of FIGS. 16A to 16C denotes a screen title and indicates that a screen for setting a custom function of the strobe transmitter is displayed. A reference numeral 1602 denotes a display indicating a title of an item on which the cursor is currently placed, and a reference numeral 1603 denotes a display indicating a current setting and indicates that the current setting is "0: display in meters". A reference numeral 1604 denotes a display indicating a content currently displayed on the display 1303. A reference numeral 1605 denotes a custom function setting item indicated by 0 to 7, and a reference numeral 1606 denotes a setting value of each custom function setting item. A reference numeral 1608 denotes a display indicating a custom function setting number on which the cursor is placed. Reference numerals 1607 and 1609 denote displays for changing the displayed contents.

If the SET button of the operation unit of the camera 100 is pressed with the cursor placed on the display 1604 as illustrated in FIG. 16A, the display 127 displays a second layer screen of a distance display as illustrated in FIG. 16B. A reference numeral 1610 denotes a display indicating the cursor position and indicates that a current setting is "0: display in meters".

If the operation unit of the camera 100 is operated to move the cursor to "1: display in feet" and the SET button is pressed, the camera 100 transmits communication for changing the setting to the strobe transmitter. In response to this, the strobe transmitter updates the settings. After that, the camera 100 causes the display 127 to display the screen illustrated in FIG. 16C. The display 1603 becomes "1: display in feet". In addition, the content of the display 1604 has also been changed.

Here, sequence information stored at the addresses 0x0E and 0xF in FIG. 14A will be described. As illustrated in FIG. 14B, the sequence information is information indicating whether a sequence of the setting screen displayed on the display 127 is the strobe transmitter setting screen or the strobe transmitter custom setting screen.

The accessory control circuit 201 updates the sequence information at the address 0x0E in response to the operation on the operation unit 212, the operation being assigned to each sequence, and thereafter requests the camera 100 for communication and transmits the sequence information to the camera 100 together with the factor. As a result, the display 127 is caused to display the setting screen of the desired series.

In a case where the operation unit 212 is composed of one member from the viewpoint of cost and size of the accessory 200, the setting screen of the desired series may be caused to be displayed by causing the accessory control circuit 201 to determine a plurality of operations on the operation unit 212. For example, in a case where the operation unit 212 is a button, the strobe transmitter setting screen may be displayed if the button is short-pressed, and the strobe transmitter custom setting screen may be displayed if the button is long-pressed. Alternatively, the setting screen of the desired series may be displayed on the display 127 by simply switching the series information at the address 0x0E in response to pressing on the button.

Third Embodiment

In this embodiment, a case will be described where the menu invocation unit included in the operation unit 212 is used to invoke a screen of an arbitrary layer other than the first layer of the setting screen of the accessory 200. In this embodiment, accessory 200 is a strobe transmitter.

Hierarchy information stored at the address 0x0E in FIG. 14A is information as illustrated in FIG. 14C indicating which hierarchy is a hierarchy of the screen that is invoked by operating the menu invocation switch and is to be displayed on the camera 100. Data subsequent to D3 at the address 0x0E is information indicating, for example, the second layer of which item in a case where the layer information is the second layer. In a case where the layer information is the second layer and the first layer information in FIG. 14D indicates the mode, the layer of the setting screen that is invoked by operating the menu invocation unit and is to be displayed on the display 127 is the second layer of the mode, and the display 127 displays the second layer screen of the light emitting mode illustrated in FIG. 15B.

Hereinafter, an operation for invoking the screen of the second layer will be described. FIGS. 18A to 18F are diagrams illustrating examples of strobe transmitter custom setting screens.

Figure 18A:
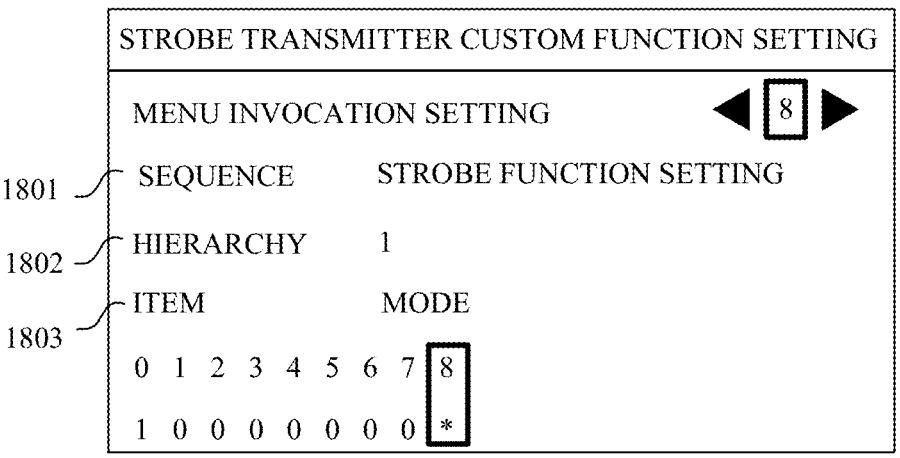
FIGS. 18A to 18F are diagrams illustrating examples of custom setting screens of a strobe transmitter according to a third embodiment.

In this embodiment, "8: menu invocation setting" is added as the custom function setting item, and FIG. 18A illustrates a screen in a case where the current setting is "8: menu invocation setting". Reference numerals 1801, 1802, and 1803 denote a sequence, hierarchy, and item to be invoked by the menu invocation unit, respectively.

Figure 18B:
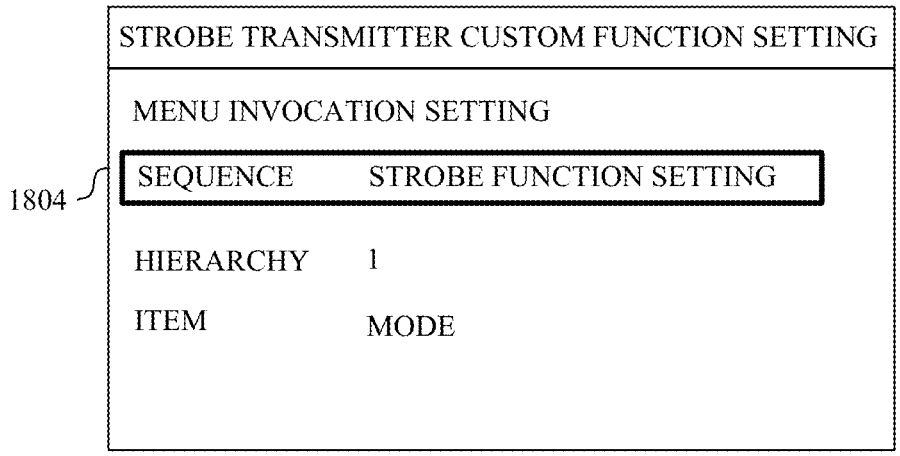
Figure 18C:
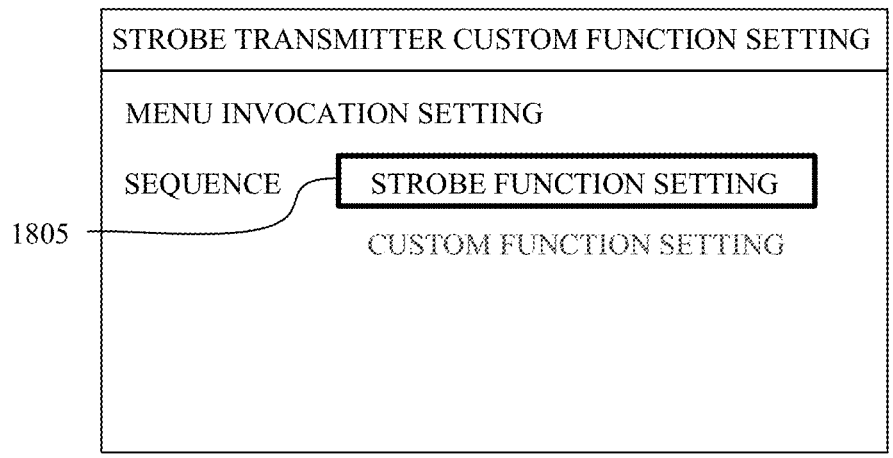
Figure 18D:
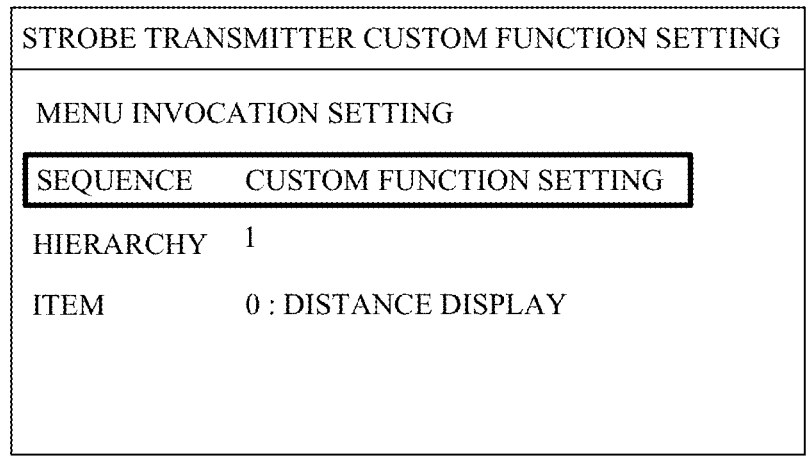
Figure 18E:
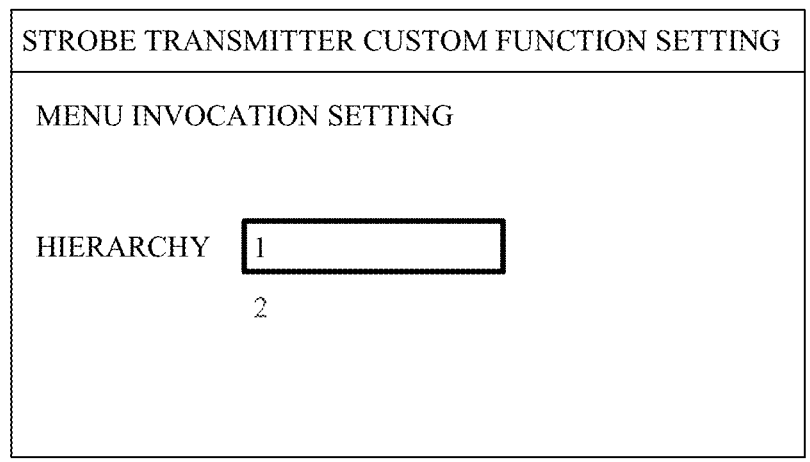
Figure 18F:
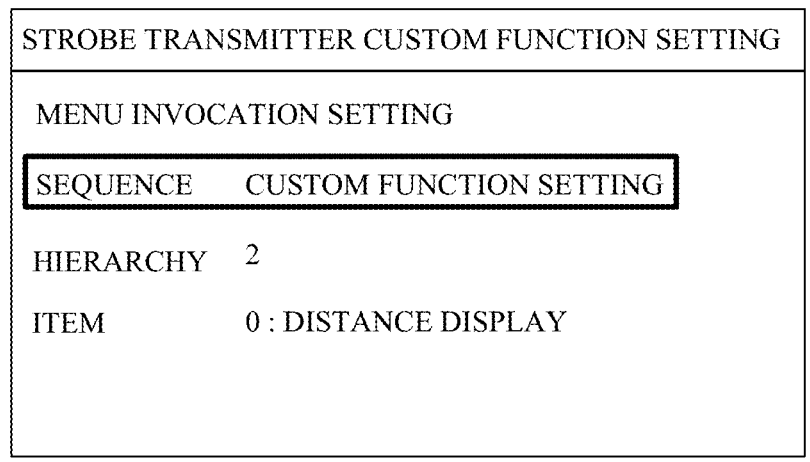

If the SET button of the operation unit (not illustrated) of the camera 100 is pressed in the state of FIG. 18A, the screen of FIG. 18B is displayed on the display 127. The user can use a cursor 1804 to select any of the series, hierarchy, and item. If the SET button is pressed in the state of FIG. 18B, the screen of FIG. 18C is displayed on the display 127. A reference numeral 1805 denotes a display indicating the cursor position and indicates that the current series is "strobe function setting". If the SET button is pressed in the state of FIG. 18C, the screen of FIG. 18D is displayed on the display 127. If the cursor is operated on the screen of FIG. 18D and the SET button is pressed with the cursor position on the hierarchy, the screen of FIG. 18E is displayed on the display 127. If the cursor is operated on the screen of FIG. 18E and the SET button is pressed with the cursor position on 2, the screen of FIG. 18F is displayed on the display 127. The same applies to changing items, and detailed description thereof will be omitted in this embodiment.

As described above, it is possible to display a screen of another series or a layer deeper than the first layer by changing the series information, the hierarchy information, and the item information on the accessory 200 to desired settings by using the operation unit 212.

In a case of resuming use of the accessory 200, when an operation is performed on the operation unit 212 for the first time, the setting screen to be displayed on the display 127 may be a setting screen in a state used last time or a setting screen set by the user.

Fourth Embodiment

In each of the first to third embodiments, the case where the accessory 200 has the menu invocation unit has been described, but in this embodiment, a case where the accessory 200 does not have the menu invocation unit will be described. In this embodiment, the accessory 200 is a strobe transmitter.

FIGS. 19A to 19D are diagrams illustrating examples of strobe transmitter custom setting screens according to this embodiment.

Figure 19A:
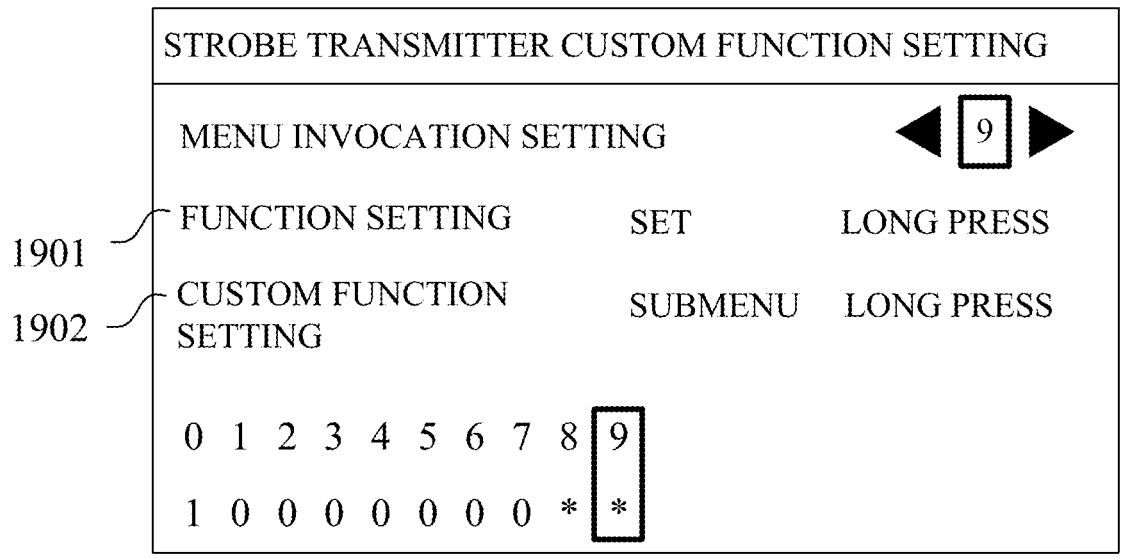
FIGS. 19A to 19D are diagrams illustrating examples of custom setting screens of a strobe transmitter according to a fourth embodiment.

In this embodiment, "9: menu invocation" is added as the custom function setting item, and FIG. 19A illustrates a screen in a case where the current setting is "9: menu invocation". Reference numerals 1901 and 1902 denote displays indicating how to invoke the strobe transmitter setting screen and the custom setting screen, respectively. In this embodiment, if the SET button of the accessory 200 is long-pressed, the accessory 200 transmits a request to invoke the strobe transmitter setting screen to the camera 100. If a SUBMENU button (not illustrated) of the accessory 200 is long-pressed, the accessory 200 transmits a request to invoke the strobe transmitter custom setting screen to the camera 100.

Figure 19B:
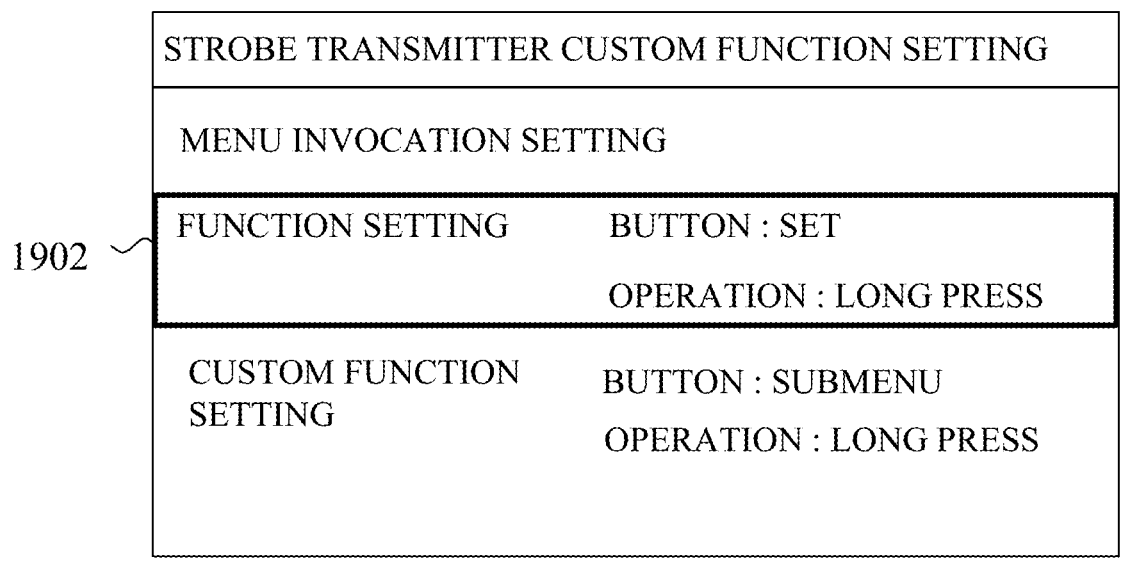
Figure 19C:
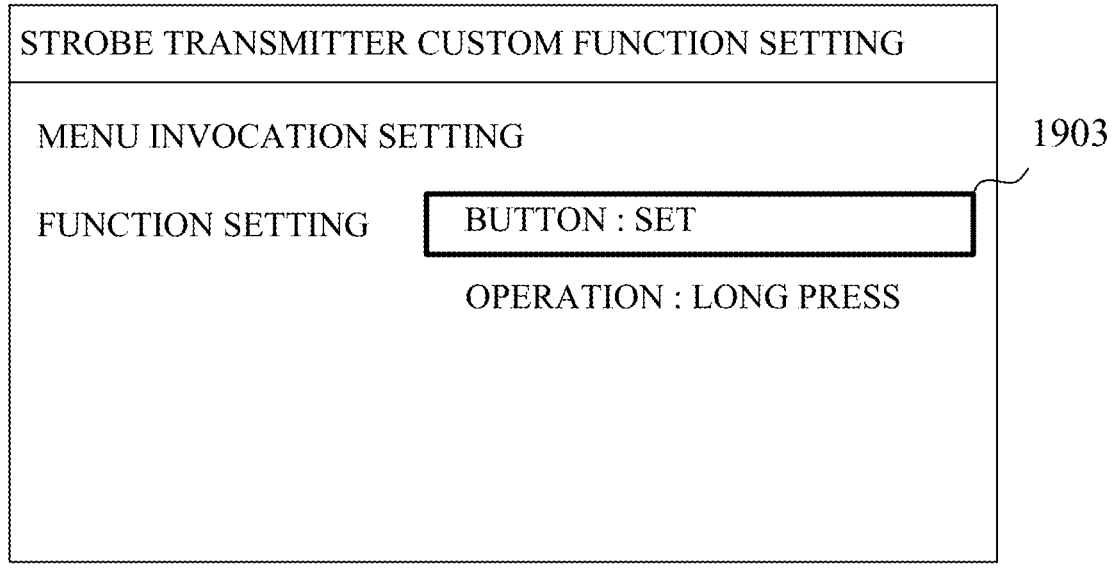
Figure 19D:
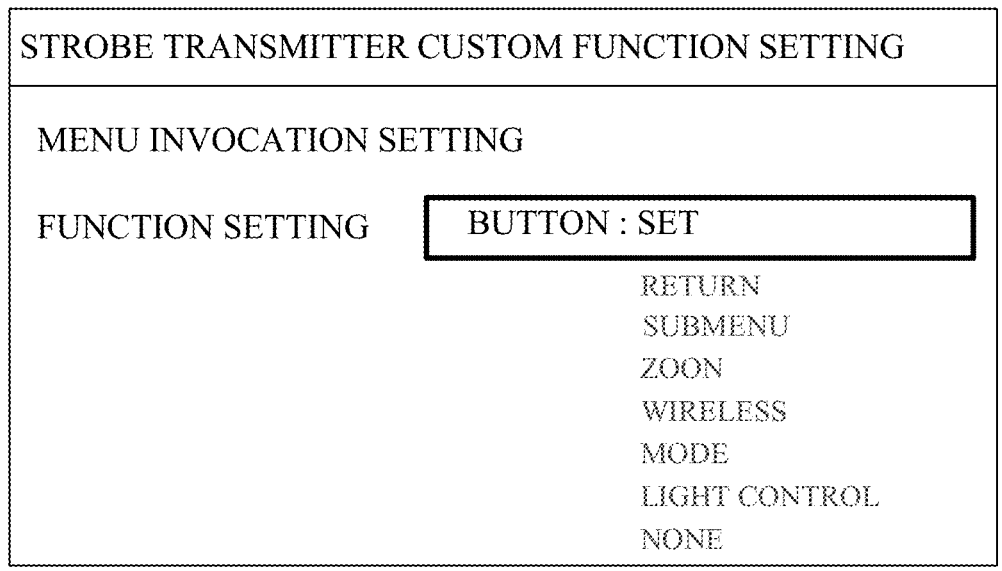

If the SET button of the operation unit (not illustrated) of the camera 100 is pressed in the state of FIG. 19A, the screen of FIG. 19B is displayed on the display 127. The user can select function settings and custom function settings using a cursor 1902. If the SET button is pressed in the state of FIG. 19B, the screen of FIG. 19C is displayed on the display 127. A reference numeral 1903 denotes a display indicating the cursor position. The user can select from changing the button settings and changing the operation settings. If the SET button is pressed in the state of FIG. 19C, the screen of FIG. 19D is displayed on the display 127. On the screen of FIG. 19D, the user can operate the cursor to select which button menu invocation of the strobe function setting is assigned to. For the other items, selection can be similarly made.

After the setting by the user is completed, the camera 100 transmits the setting contents to the accessory 200, and the accessory 200 performs update based on the setting contents. After that, the accessory 200 performs control based on the updated information, and thereby it is possible to assign the menu invocation function even to an accessory that does not have the menu invocation unit. If detailed settings such as a setting on the hierarchy information is to be made, the method described in this embodiment and the method described in the third embodiment may be combined.

As described above, even in the accessory 200 that does not have the menu invocation unit, the menu of the accessory 200 can be displayed on the camera 100 by operating the existing button and assigning the menu invocation function. As a result, the menu of the accessory 200 can be easily displayed even in a case where the setting is changed by using the display 127 and the operation unit of the camera 100.

In a case where the accessory 200 is provided with a display and an operation unit, a menu invocation operation may be executed while a predetermined screen (for example, a screen of the first layer) is displayed on the display of the accessory 200. This makes it possible to prevent malfunction. If the accessory 200 is not attached to the camera 100 and an operation requesting menu invocation is performed, information such as "camera is not connected" may be displayed on the display of the accessory 200.

In each of the above embodiments, the electronic apparatus is the image pickup apparatus, but the electronic apparatus according to the present invention may include various electronic apparatuses other than the image pickup apparatus.

In each of the above embodiments, a description is mainly given of a case where the accessory 200 is directly attached to the camera 100, but another attachment form may be used. For example, the camera 100 and a main accessory corresponding to the accessory 200 may communicate with each other via an intermediate accessory such as an adapter device to which the camera 100 and the main accessory are attached. In this case, the intermediate accessory may execute communication control similar to at least part of the communication control executed by the accessory 200 and the communication control executed by the camera 100, which are described in the above embodiments. The intermediate accessory may serve as an information transmission path such that the intermediate accessory outputs, to the main accessory, information corresponding to information input from the camera 100 and outputs, to the camera 100, information corresponding to information input from the main accessory. Thus, the accessory according to the embodiments of the present invention includes various accessories such as a microphone device, an illumination device, and an adapter device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-072950, filed on Apr. 23, 2021, which is hereby incorporated by reference herein in its entirety.

What is claimed is:

1. An accessory detachably attachable to an electronic apparatus including a display, the accessory comprising:
a communication unit configured to include a plurality of terminals and communicate with the electronic apparatus,
wherein if a predetermined operation is performed on the accessory after the communication unit transmits information indicating a type of the accessory to the electronic apparatus, the communication unit transmits, to the electronic apparatus, a first signal indicating a communication request via a first terminal among the plurality of terminals, and in response to a signal received after transmitting the first signal, the communication unit transmits, to the electronic apparatus, a second signal indicating a request for causing the display to display a setting image related to the accessory via a second terminal among the plurality of terminals, the second terminal being different from the first terminal.

2. The accessory according to claim 1, further comprising a memory configured to store the information indicating the type of the accessory.

3. The accessory according to claim 1, wherein in a case where the accessory stores necessary information for causing the display to display the setting image, the communication unit transmits, to the electronic apparatus, the necessary information together with the second signal.

4. The accessory according to claim 3, wherein the necessary information includes setting information on the accessory.

5. The accessory according to claim 3, wherein the display is capable of displaying, as the setting image, a first setting image and a second setting image, wherein at least one of a sequence and a hierarchy is different between the first setting image and the second setting image, and
wherein the necessary information includes:
setting information on the accessory; and
information on the first setting image or the second setting image.

6. The accessory according to claim 1, wherein the display is capable of displaying, as the setting image, a first setting image and a second setting image, wherein at least one of a sequence and a hierarchy is different between the first setting image and the second setting image, and
wherein an operation on the accessory for causing the first setting image to be displayed is different from an operation on the accessory for causing the second setting image to be displayed.

7. The accessory according to claim 1, wherein the display is capable of displaying, as the setting image, a first setting image and a second setting image, wherein at least one of a sequence and a hierarchy is different between the first setting image and the second setting image, and
wherein the first setting image and the second setting image are switched every time a same operation is performed on the accessory.

8. The accessory according to claim 1, wherein the predetermined is at least one of a short press, a long press, a double click, simultaneous presses on a plurality of operation units, a dial operation, and a combination of these operations.

9. The accessory according to claim 1, wherein the display is capable of displaying, as the setting image, a first setting image and a second setting image, wherein at least one of a sequence and a hierarchy is different between the first setting image and the second setting image, and
wherein if an operation is performed on the accessory for the first time since the communication unit transmitted the information indicating the type of the accessory to the electronic apparatus, the display displays a setting image in a state used last time or a setting image set by a user.

10. The accessory according to claim 1, further comprising an accessory-side display configured to display information indicating that the second signal has been transmitted if the second signal is transmitted.

11. The accessory according to claim 1, wherein the accessory is attached to an accessory shoe portion of the electronic apparatus.

12. An electronic apparatus to which an accessory is detachably attachable, the electronic apparatus comprising:
a communication unit capable of communicating with the accessory; and
a display configured to display a setting image related to the accessory,
wherein the communication unit includes a plurality of terminals, and
wherein if, after receiving information indicating a type of the accessory, the communication unit receives a first signal indicating a communication request via a first terminal among the plurality of terminals and receives a second signal indicating a request for causing the display to display the setting image via a second terminal among the plurality of terminals, the second terminal being different from the first terminal, the display displays the setting image.

13. The electronic apparatus according to claim 12, wherein the communication unit receives setting information necessary for causing the display to display the setting image together with the second signal.

14. The electronic apparatus according to claim 13, wherein the setting information includes information on a first setting image or a second setting image, wherein at least one of a sequence and a hierarchy is different between the first setting image and the second setting image, and
wherein the display displays the first setting image or the second setting image as the setting image according to the setting information.

15. The electronic apparatus according to claim 12, wherein the accessory is attached to an accessory shoe portion of the electronic apparatus.

16. An accessory detachably attachable to an electronic apparatus including a display, the accessory comprising:
a communication unit configured to include a plurality of terminals and communicate with the electronic apparatus;
an operation unit configured to include a member used for operating the accessory; and
an accessory-side display,
wherein if an operation is performed on the operation unit after the communication unit transmits information indicating a type of the accessory to the electronic apparatus, the communication unit transmits, to the electronic apparatus, a request for causing the display to display a setting image related to the accessory,
wherein the operation unit is operated for causing execution of a different function that is different from a function of causing transmission of the request for causing the display to display the setting image, and
wherein in a case where a predetermined image is displayed on the accessory-side display, the communication unit transmits the request for causing the display to display the setting image if the operation is performed on the operation unit.

* * * * *